(12) United States Patent
Wang et al.

(10) Patent No.: US 12,348,739 B2
(45) Date of Patent: Jul. 1, 2025

(54) ADAPTATION PARAMETER SET IDENTIFIER VALUE SPACES IN VIDEO CODING

(71) Applicant: Huawei Technologies Co., Ltd., Shenzhen (CN)

(72) Inventors: Ye-Kui Wang, San Diego, CA (US); Fnu Hendry, San Diego, CA (US); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 531 days.

(21) Appl. No.: 17/459,789

(22) Filed: Aug. 27, 2021

(65) Prior Publication Data

US 2021/0392323 A1 Dec. 16, 2021

Related U.S. Application Data

(63) Continuation of application No. PCT/US2020/019920, filed on Feb. 26, 2020.
(Continued)

(51) Int. Cl.
| | |
|---|---|
| *H04N 19/186* | (2014.01) |
| *H04N 19/117* | (2014.01) |
| *H04N 19/169* | (2014.01) |
| *H04N 19/174* | (2014.01) |
| *H04N 19/187* | (2014.01) |

(Continued)

(52) U.S. Cl.
CPC ......... *H04N 19/186* (2014.11); *H04N 19/117* (2014.11); *H04N 19/174* (2014.11); *H04N 19/187* (2014.11); *H04N 19/188* (2014.11); *H04N 19/30* (2014.11); *H04N 19/46* (2014.11); *H04N 19/70* (2014.11); *H04N 19/82* (2014.11)

(58) Field of Classification Search
CPC ............................ H04N 19/70; H04N 19/186
See application file for complete search history.

(56) References Cited

U.S. PATENT DOCUMENTS

| | | | |
|---|---|---|---|
| 2013/0114694 | A1 | 5/2013 | Chen et al. |
| 2013/0182755 | A1 | 7/2013 | Chen et al. |

(Continued)

FOREIGN PATENT DOCUMENTS

| | | |
|---|---|---|
| JP | 2015507428 A | 3/2015 |
| JP | 2020526942 A | 8/2020 |

(Continued)

OTHER PUBLICATIONS

USPTO, Written Opinion for PCT/US2020/019920 (Jun. 5, 2020) (Year: 2020).*

(Continued)

*Primary Examiner* — David N Werner
(74) *Attorney, Agent, or Firm* — Conley Rose, P.C.

(57) ABSTRACT

A video coding mechanism is disclosed. The mechanism includes receiving a bitstream comprising a slice and a plurality of adaptation parameter sets (APSs) including a plurality of APS types, wherein each APS includes an APS identifier (ID), and wherein APS IDs for the APS types are assigned in sequence over a plurality of different value spaces. The mechanism further includes decoding the slice using parameters from the plurality of APSs. The mechanism further includes forwarding the slice for display as part of a decoded video sequence.

11 Claims, 10 Drawing Sheets

Related U.S. Application Data

(60) Provisional application No. 62/850,973, filed on May 21, 2019, provisional application No. 62/816,753, filed on Mar. 11, 2019, provisional application No. 62/811,358, filed on Feb. 27, 2019.

(51) Int. Cl.
  H04N 19/30 (2014.01)
  H04N 19/46 (2014.01)
  H04N 19/70 (2014.01)
  H04N 19/82 (2014.01)

(56) References Cited

U.S. PATENT DOCUMENTS

| | | |
|---|---|---|
| 2013/0259118 A1 | 10/2013 | Fu et al. |
| 2015/0103900 A1 | 4/2015 | Liu et al. |
| 2017/0359576 A1 | 12/2017 | Gamei et al. |
| 2018/0014030 A1 | 1/2018 | Korodi et al. |
| 2021/0281876 A1* | 9/2021 | Zhang ............ H04N 19/117 |
| 2022/0109888 A1* | 4/2022 | Paluri ............ H04N 19/105 |
| 2022/0132110 A1* | 4/2022 | Paluri ............ H04N 19/70 |

FOREIGN PATENT DOCUMENTS

| | | |
|---|---|---|
| WO | 2013064112 A1 | 5/2013 |
| WO | 2013070703 A1 | 5/2013 |
| WO | 2013109505 A2 | 7/2013 |
| WO | 2019006300 A1 | 1/2019 |

OTHER PUBLICATIONS

"Line Transmission of Non-Telephone Signals, Video Codec for Audiovisual Services at px64 kbits," ITU-T Recommendation H.261, Mar. 3, 1993, 29 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Auddiovisual and Multimedia Systems Infrastructure of Audiovisual Services—Coding of Moving Video, ITU-T H.263, Jan. 2005, 226 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Dec. 2016, 664 pages.

Bross, et al., "Versatile Video Coding (Draft 4)," Joint Video Experts Team (JVET) of ITU-T SG 16 WP 3 and ISO/IEC JTC 1/SC 29 /WG 11, 13th Meeting Marrakech, MA, Jan. 9-18, 2019, Document: JVET-M1001-v5, 287 pages.

Chen, et al., "Algorithm Description for Versatile Video Coding and Test Model 4 (VTM 4)," Joint Video Experts Team (JVET) of ITU-T SG 16 WP 3 and ISO/IEC JTC 1/SC 29/WG 11, 13th Meeting: Marrakech, MA, Jan. 9-18, 2019, Document JVET-M1002-v1, 63 pages.

Document: JCTVC-I0081, Hendry, et al., "APS partial update—APS update with one or multiple references," Joint Collaborative Team on Video Coding (JCT-VC) of ITU-T SG 16 WP 3 and ISO/IEC JTC 1/SC 29/WG11, 9th Meeting: Geneva, CH, Apr. 27-May 7, 2012, 10 pages.

Document: JCTVC-I0572, WG 11 No. m25198, Deshpande, S., "Crosscheck for APS Error Resilience and Partial Updating (JCTVC-I0069)," Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, 2 pages.

Document: JVET-M0132-v2, Wang, Y.K., et al., "AHG17: On header parameter set (HPS)," Joint Video Experts Team (JVET) of ITU-T SG 16 WP 3 and ISO/IECJTC 1/SC 29/WG11, 13th Meeting: Marrakech, MA, Jan. 9-18, 2019, 4 pages.

Document: JVET-M1002-v2, Chen J. et al., "Algorithm description for Versatile Video Coding and Test Model 4 (VTM 4)," Joint Video Experts Team (JVET) of ITU-T SG 16 WP 3 and ISO/IEC JTC 1/SC 29/WG 11 13th Meeting: Marrakech, MA, Jan. 9-18, 2019, 63 pages.

* cited by examiner

ADAPTATION PARAMETER SET IDENTIFIER VALUE SPACES IN VIDEO CODING

CROSS-REFERENCE TO RELATED APPLICATIONS

This patent application is a continuation of International Application No. PCT/US2020/019920, filed Feb. 26, 2020 by Ye-Kui Wang, et. al., and titled "Adaptation Parameter Set Identifier Value Spaces In Video Coding," which claims the benefit of U.S. Provisional Patent Application No. 62/811,358, filed Feb. 27, 2019 by Ye-Kui Wang, et. al., and titled "Adaptation Parameter Set for Video Coding," U.S. Provisional Patent Application No. 62/816,753, filed Mar. 11, 2019 by Ye-Kui Wang, et. al., and titled "Adaptation Parameter Set for Video Coding," and U.S. Provisional Patent Application No. 62/850,973, filed May 21, 2019 by Ye-Kui Wang, et. al., and titled "Adaptation Parameter Set for Video Coding," which are hereby incorporated by reference.

TECHNICAL FIELD

The present disclosure is generally related to video coding, and is specifically related to efficient signaling of coding tool parameters used to compress video data in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a decoder, the method comprising: receiving, by a receiver of the decoder, a bitstream comprising a plurality of adaptation parameter sets (APSs) including a plurality of APS types associated with a coded slice, wherein each APS includes a corresponding APS identifier (ID), and wherein each of the APS types uses a separate value space for the APS IDs; decoding, by the processor, the coded slice using parameters from the plurality of APSs obtained based on the APS IDs; and forwarding, by the processor, the decoding results for display as part of a decoded video sequence. An APS is used to maintain data that relates to multiple slices over multiple pictures. The present disclosure describes various APS related improvements. In the present example, each APS includes an APS ID. Further, each APS type includes a separate value space for corresponding APS IDs. Such value spaces can overlap. Accordingly, an APS of a first type, such as an adaptive loop filter (ALF) APS, can include the same APS ID as an APS of a second type, such as a luma mapping with chroma scaling (LMCS) APS. This is accomplished by identifying each APS by a combination of an APS parameter type and an APS ID. By allowing each APS type to include a different value space, the codec does not need to check across APS types for ID conflicts. Further, by allowing the value spaces to overlap, the codec can avoid employing larger ID values, which results in a bit savings. As such, employing separate overlapping value spaces for APSs of different types increases coding efficiency and hence reduces the usage of network resources, memory resources, and/or processing resources at the encoder and the decoder.

Optionally, in any of the preceding aspects, another implementation of the aspect provides, wherein the separate value spaces are overlapping.

Optionally, in any of the preceding aspects, another implementation of the aspect provides, wherein the plurality of APS types include an ALF type containing ALF parameters, a scaling list type containing scaling list parameters, and a LMCS type containing LMCS parameters.

Optionally, in any of the preceding aspects, another implementation of the aspect provides, wherein each APS includes an APS parameter type (aps_params_type) code set to a predefined value indicating a type of parameters included in the each APS.

Optionally, in any of the preceding aspects, another implementation of the aspect provides, wherein a current APS includes a current APS ID selected from a predefined range across a current value space, wherein the current APS ID is related to a previous APS ID associated with a previous APS of a same type as the current APS, and wherein the current APS ID is not related to another previous APS ID associated with another previous APS of a different type than the current APS.

Optionally, in any of the preceding aspects, another implementation of the aspect provides, wherein each of the separate value spaces extend over a predefined range, and wherein the predefined ranges are determined based on the APS types.

Optionally, in any of the preceding aspects, another implementation of the aspect provides, wherein each APS is identified by a combination of a current APS type and a current APS ID.

In an embodiment, the disclosure includes a method implemented in an encoder, the method comprising: encoding, by a processor of the encoder, a slice into a bitstream as a coded slice; determining, by the processor, a plurality of types of parameters employed for encoding the coded slice; encoding into the bitstream, by the processor, the plurality of types of parameters in a plurality of APSs by including the plurality of types of parameters in a plurality of APS types; assigning, by the processor, a corresponding APS ID to each of the APSs such that each of the APS types uses a separate value space for the APS IDs; encoding, by the processor, each APS ID into the plurality of APSs; storing, by a memory coupled to the processor, the bitstream for communication toward a decoder. An APS is used to maintain data that relates to multiple slices over multiple pictures. The present disclosure describes various APS related improvements. In the present example, each APS includes an APS ID. Further, each APS type includes a separate value space for corresponding APS IDs. Such value spaces can overlap. Accordingly, an APS of a first type (e.g., an ALF APS) can include the same APS ID as an APS of a second type (e.g., a LMCS APS). This is accomplished by identifying each APS by a combination of an APS parameter type and an APS ID. By allowing each APS type to include a different value space, the codec does not need to check across APS types for ID conflicts. Further, by allowing the value spaces to overlap, the codec can avoid employing larger ID values, which results in a bit savings. As such, employing separate overlapping value spaces for APSs of different types increases coding efficiency and hence reduces the usage of network resources, memory resources, and/or processing resources at the encoder and the decoder Optionally, in any of the preceding aspects, another implementation of the aspect provides, wherein the separate value spaces are overlapping.

Optionally, in any of the preceding aspects, another implementation of the aspect provides, wherein the plurality of APS types include an ALF type containing ALF parameters, a scaling list type containing scaling list parameters, and a LMCS type containing LMCS parameters.

Optionally, in any of the preceding aspects, another implementation of the aspect provides, wherein each APS includes an aps_params_type code set to a predefined value indicating a type of parameters included in the each APS.

Optionally, in any of the preceding aspects, another implementation of the aspect provides, wherein a current APS includes a current APS ID selected from a predefined range across a current value space, wherein the current APS ID is related to a previous APS ID associated with a previous APS of a same type as the current APS, and wherein the current APS ID is not related to another previous APS ID associated with another previous APS of a different type than the current APS.

Optionally, in any of the preceding aspects, another implementation of the aspect provides, wherein each of the separate value spaces extend over a predefined range, and wherein the predefined ranges are determined based on the APS types.

Optionally, in any of the preceding aspects, another implementation of the aspect provides, wherein each APS is identified by a combination of a current APS type and a current APS ID.

In an embodiment, the disclosure includes a video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a plurality of APSs including a plurality of APS types associated with a coded slice, wherein each APS includes a corresponding APS ID, and wherein each of the APS types uses a separate value space for the APS IDs; a decoding means for decoding the coded slice using parameters from the plurality of APSs obtained based on the APS IDs; and a forwarding means for forwarding the decoding results for display as part of a decoded video sequence.

Optionally, in any of the preceding aspects, another implementation of the aspect provides, wherein the decoder is further configured to perform the method of any of the preceding aspects.

In an embodiment, the disclosure includes an encoder comprising: a determining means for determining a plurality of types of parameters employed for encoding a slice; an encoding means for: encoding the slice into a bitstream as a coded slice; encoding into the bitstream the plurality of types of parameters in a plurality of APSs by including the plurality of types of parameters in a plurality of APS types; and encoding each APS ID into the plurality of APSs; an assigning means for assigning a corresponding APS ID to each of the APSs such that each of the APS types uses a separate value space for the APS IDs; and a storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
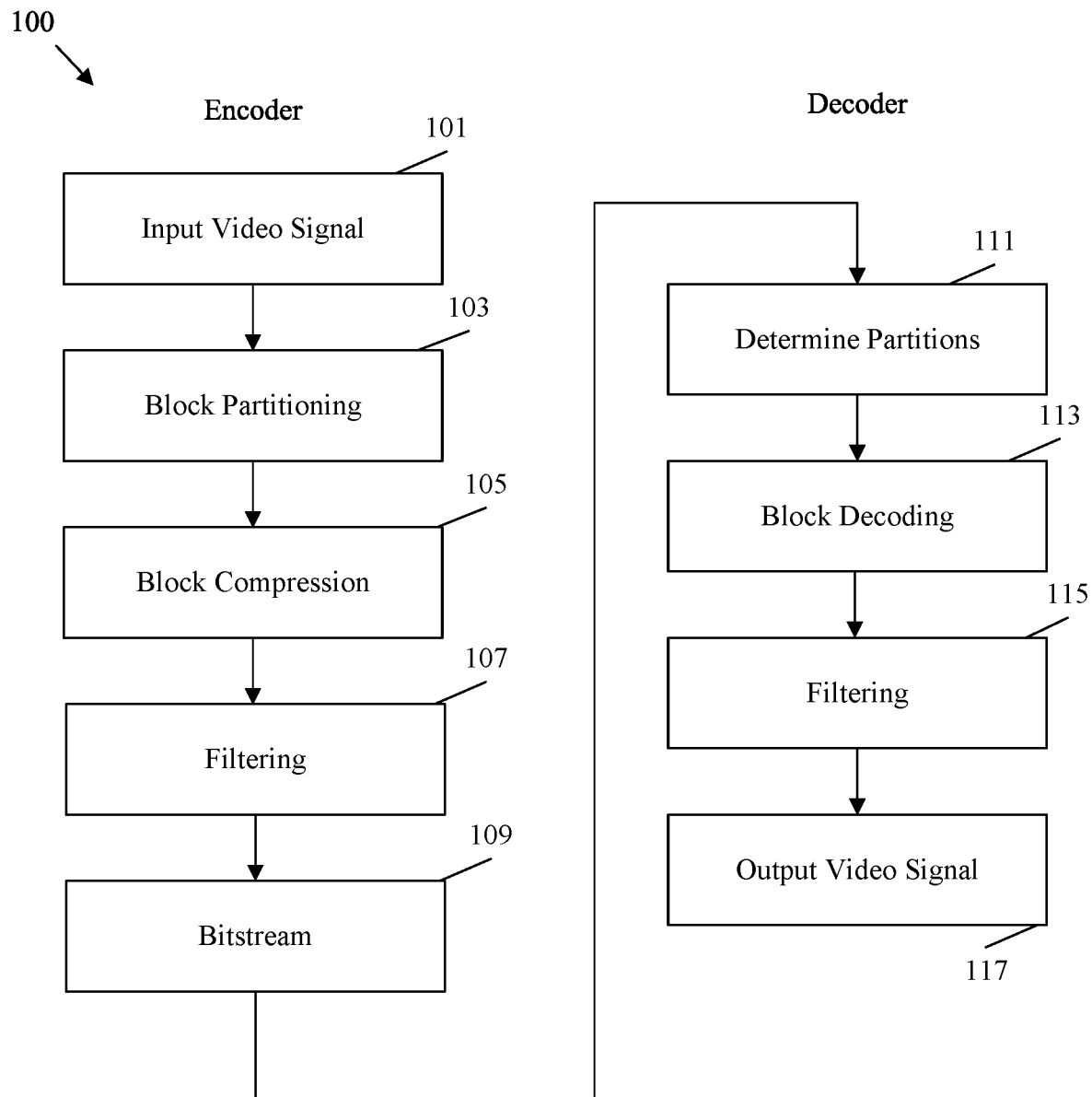
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following acronyms are used herein, Adaptive Loop Filter (ALF), Adaptation Parameter Set (APS), Coding Tree Block (CTB), Coding Tree Unit (CTU), Coding Unit (CU), Coded Video Sequence (CVS), Dynamic Adaptive Streaming over Hypertext transfer protocol (DASH), Intra-Random Access Point (IRAP), Joint Video Experts Team (JVET), Motion-Constrained Tile Set (MCTS), Maximum Transfer Unit (MTU), Network Abstraction Layer (NAL), Picture Order Count (POC), Raw Byte Sequence Payload (RBSP), Sample Adaptive Offset (SAO), Sequence Parameter Set (SPS), Versatile Video Coding (VVC), and Working Draft (WD).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-M1001-v5 and JVET-M1002-v1, which provides an algorithm description, an encoder-side description of the VVC WD, and reference software.

Video sequences are coded by employing various coding tools. The encoder selects parameters for the coding tools with the objective of increasing compression with a minimal loss of quality when the video sequence is decoded. Coding tools may be relevant to different portions of the video at different scopes. For example, some coding tools are relevant at a video sequence level, some coding tools are relevant at a picture level, some coding tools are relevant at a slice level, etc. An APS may be employed to signal information that can be shared by multiple pictures and/or multiple slices across different pictures. Specifically, an APS may carry Adaptive Loop Filter (ALF) parameters. ALF information may not be suitable for signaling at the sequence level in a Sequence Parameter Set (SPS), at picture level in a Picture Parameter Set (PPS) or a picture header, or at a slice level in a tile group/slice header for various reasons.

If ALF information is signaled in the SPS, an encoder has to generate a new SPS and a new IRAP picture whenever ALF information changes. IRAP pictures significantly reduce coding efficiency. So placing ALF information in an SPS is particularly problematic for low-delay application environments that do not employ frequent IRAP pictures. Inclusion of ALF information in the SPS may also disable out-of-band transmission of SPSs. Out-of-band transmission refers to transmission of corresponding data in different transport data flows than the video bitstream (e.g., in a sample description or sample entry of a media file, in a Session Description Protocol (SDP) file, etc.) Signaling ALF information in a PPS may also be problematic for similar reasons. Specifically, inclusion of ALF information in the PPS may disable out-of-band transmission of PPSs. Signaling ALF information in a picture header may also be problematic. Picture headers may not be employed in some cases. Further, some ALF information may apply to multiple pictures. Thus signaling ALF information in the picture header causes redundant information transmission, and hence wastes bandwidth. Signaling ALF information in the tile group/slice header is also problematic, since the ALF information may apply to multiple pictures and hence to multiple slices/tile groups. Accordingly, signaling ALF information in the slice/tile group header causes redundant information transmission, and hence wastes bandwidth.

Based on the forgoing, an APS may be employed to signal ALF parameters. However, video coding systems may employ the APS exclusively for signaling ALF parameters. An example APS syntax and semantics are as follows:

|  | Descriptor |
| --- | --- |
| adaptation_parameter_set_rbsp( ) { | |
|     adaptation_parameter_set_id | u(5) |
|     alf_data( ) | |
|     aps_extension_flag | u(1) |
|     if( aps_extension_flag ) | |
|       while( more_rbsp_data( ) ) | |
|         aps_extension_data_flag | u(1) |
|     rbsp_trailing_bits( ) | |
| } | |

The adaptation_parameter_set_id provides an identifier for the APS for reference by other syntax elements. APSs can be shared across pictures and can be different in different tile groups within a picture. The aps_extension_flag is set equal to zero to specify that no aps_extension_data_flag syntax elements are present in the APS RBSP syntax structure. The aps_extension_flag is set equal to one to specify that there are aps_extension_data_flag syntax elements present in the APS RBSP syntax structure. The aps_extension_data_flag may have any value. The presence and value of aps_extension_data_flag may not affect decoder conformance to profiles as specified in VVC. Decoders conforming to VVC may ignore all aps_extension_data_flag syntax elements.

An example tile group header syntax related to ALF parameters is as follows:

|  | Descriptor |
| --- | --- |
| tile_group_header( ) { | |
| ... | |
|   if( sps_alf_enabled_flag ) { | |

*-continued*

|  | Descriptor |
| --- | --- |
|     tile_group_alf_enabled_flag | u(1) |
|     if( tile_group_alf_enabled_flag ) | |
|       tile_group_aps_id | u(5) |
|   } | |
| ... | |
| } | |

The tile_group_alf_enabled_flag is set equal to one to specify that the adaptive loop filter is enabled and may be applied to luma (Y), blue chroma (Cb), or red chroma (Cr) color components in a tile group. The tile_group_alf_enabled_flag is set equal to zero to specify that the adaptive loop filter is disabled for all color components in a tile group. The tile_group_aps_id specifies the adaptation_parameter_set_id of the APS referred to by the tile group. The TemporalId of the APS NAL unit having adaptation_parameter_set_id equal to tile_group_aps_id shall be less than or equal to the TemporalId of the coded tile group NAL unit. When multiple APSs with the same value of adaptation_parameter_set_id are referred to by two or more tile groups of the same picture, the multiple APSs with the same value of adaptation_parameter_set_id may include the same content.

Reshaper parameters are parameters employed for an adaptive in-loop reshaper video coding tool, which is also known as luma mapping with chroma scaling (LMCS). An example SPS reshaper syntax and semantics are as follows:

|  | Descriptor |
| --- | --- |
| seq_parameter_set_rbsp( ) { | |
| ... | |
|   sps_reshaper_enabled_flag | u(1) |
| ... | |
| } | |

The sps_reshaper_enabled_flag is set equal to one to specify that the reshaper is used in the coded video sequence (CVS). The sps_reshaper_enabled_flag is set equal to zero to specify that reshaper is not used in the CVS.

An example tile group header/slice header reshaper syntax and semantics are as follows:

|  | Descriptor |
| --- | --- |
| tile_group_header( ) { | |
| ... | |
|   if( sps_reshaper_enabled_flag) { | |
|     tile_group_reshaper_model_present_flag | u(1) |
|     if(tile_group_reshaper_model_present_flag ) | |
|       tile_group_reshaper_model ( ) | |
|     tile_group_reshaper_enable_flag | u(1) |
|     if( tile_group_reshaper_enable_flag && (!( qtbtt_dual_tree_intra_flag && tile_group_type == I ) ) ) | |
|       tile_group_reshaper_chroma_residual_scale_flag | u(1) |
|   } | |
| ... | |
| } | |

The tile_group_reshaper_model_present_flag is set equal to one to specify that the tile_group_reshaper_model( ) is present in tile group header. The tile_group_reshaper_model_present_flag is set equal to zero to specify that the tile_group_reshaper_model( ) is not present in tile group header. When the tile_group_reshaper_model_present_flag is not present, the flag is inferred to be equal to zero. The tile_group_reshaper_enabled_flag is set equal to one to specify that the reshaper is enabled for the current tile group. The tile_group_reshaper_enabled_flag is set equal to zero to specify that reshaper is not enabled for the current tile group. When tile_group_reshaper_enable_flag is not present, the flag is inferred to be equal to zero. The tile_group_reshaper_chroma_residual_scale_flag is set equal to one to specify that chroma residual scaling is enabled for the current tile group. The tile_group_reshaper_chromaresidual_scale_flag is set equal to zero to specify that chroma residual scaling is not enabled for the current tile group. When tile_group_reshaper_chroma_residual_scale_flag is not present, the flag is inferred to be equal to zero.

An example tile group header/slice header reshaper model syntax and semantics are as follows:

|  | Descriptor |
|---|---|
| tile_group_reshaper_model ( ) { |  |
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx; i ++) { |  |
|     reshape_model_bin_delta_abs_CW[ i ] | u(v) |
|     if( reshaper_model_bin_delta_abs_CW[ i ] ) > 0 ) |  |
|       reshaper_model_bin_delta_sign_CW_flag [ i ] | u(1) |
|   } |  |
| } |  |

The reshape_model_min_bin_idx specifies the minimum bin (or piece) index to be used in the reshaper construction process. The value of reshape_model_min_bin_idx may be in the range of zero to MaxBinIdx, inclusive. The value of MaxBinIdx may be equal to fifteen. The reshape_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx minus reshape_model_delta_max_bin_idx. The reshaper_model_bin_delta_abs_cw_prec_minus1 plus one specifies the number of bits used for the representation of the syntax reshape_model_bin_delta_abs_CW[i]. The reshape_model_bin_delta_abs_CW[i] specifies the absolute delta codeword value for the ith bin.

The reshaper_model_bin_delta_sign_CW_flag[i] specifies the sign of reshape_model_bin_delta_abs_CW[i] as follows. If reshape_model_bin_delta_sign_CW_flag[i] is equal to zero, the corresponding variable RspDeltaCW[i] is a positive value. Otherwise, (e.g., reshape_model_bin_delta_sign_CW_flag[i] is not equal to zero), the corresponding variable RspDeltaCW[i] is a negative value. When reshape_model_bin_delta_sign_CW_flag[i] is not present, the flag is inferred to be equal to zero. The variable RspDeltaCW[i] is set equal to (1−2*reshape_model_bin_delta_sign_CW[i]) *reshape_model_bin_delta_abs_CW[i].

The variable RspCW[i] is derived as follows. The variable OrgCW is set equal to (1<<BitDepthY)/(MaxBinIdx+1). If reshaper_model_min_bin_idx<=i<=reshaper_model_max_bin_idx RspCW[i]=OrgCW+RspDeltaCW[i]. Otherwise, RspCW[i]=zero. The value of RspCW [i] shall be in the range of thirty two to 2*OrgCW−1 if the value of BitDepthY is equal to ten. The variables InputPivot[i] with i in the range of 0 to MaxBinIdx+1, inclusive are derived as follows. InputPivot[i]=i*OrgCW. The variable ReshapePivot[i] with i in the range of 0 to MaxBinIdx+1, inclusive, the variable ScaleCoef[i] and InvScaleCoeff[i] with i in the range of zero to MaxBinIdx, inclusive, are derived as follows:

```
shiftY = 14
ReshapePivot[ 0 ] = 0;
for( i = 0; i <= MaxBinIdx ; i++) {
    ReshapePivot[ i + 1 ] = ReshapePivot[ i ] + RspCW[ i ]
ScaleCoef[ i ] = ( RspCW[ i ] * (1 << shiftY) + (1 << (Log2(OrgCW) − 1))) >>
(Log2(OrgCW))
if ( RspCW[ i ] == 0 )
    InvScaleCoeff[ i ] = 0
else
    InvScaleCoeff[ i ] = OrgCW * (1 << shiftY) / RspCW[ i ]
}
```

The variable ChromaScaleCoef[i] with i in the range of 0 to MaxBinIdx, inclusive, are derived as follows:
ChromaResidualScaleLut[64]={16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 1024};
shiftC=11
if (RspCW[i]==0)
ChromaScaleCoef[i]=(1<<shiftC)
Otherwise (RspCW[i]!=0),
ChromaScaleCoef[i]=ChromaResidualScaleLut[RspCW[i]>>1]

The properties of the reshaper parameters can be characterized as follows. The size of a set of the reshaper parameters contained in the tile_group_reshaper_model( ) syntax structure is usually around sixty to one hundred bits. The reshaper model is usually updated by the encoder about once per second, which includes many frames. Further, the parameters of an updated reshaper model are unlikely to be exactly the same as the parameters of an earlier instance of the reshaper model.

The forgoing video coding systems include certain problems. First, such systems are only configured to carry ALF parameters in the APS. Further, reshaper/LMCS parameters can be shared by multiple pictures and can include many variations.

Disclosed herein are various mechanisms to modify the APS to support increased coding efficiency. In a first example, multiple types of APSs are disclosed. Specifically, an APS of type ALF, referred to as an ALF APS, can contain ALF parameters. Further, an APS of type scaling list, referred to as a scaling list APS, can contain scaling list parameters. In addition, an APS of type LMCS, referred to as an LMCS APS, can contain LMCS/reshaper parameters. The ALF APS, scaling list APS, and the LMCS APS may each be coded as separate NAL types, and hence included in different NAL units. In this way, a change to data in one type of APS (e.g., ALF parameters) does not result in a redundant coding of other types of data that do not change (e.g., LMCS parameters). Accordingly, providing multiple types of APSs increases coding efficiency and hence reduces the usage of network resources, memory resources, and/or processing resources at the encoder and the decoder.

In a second example, each APS includes an APS Identifier (ID). Further, each APS type includes a separate value space for corresponding APS IDs. Such value spaces can overlap. Accordingly, an APS of a first type (e.g., an ALF APS) can include the same APS ID as an APS of a second type (e.g., a LMCS APS). This is accomplished by identifying each APS by a combination of an APS parameter type and an APS ID. By allowing each APS type to include a different value space, the codec does not need to check across APS types for ID conflicts. Further, by allowing the value spaces to overlap, the codec can avoid employing larger ID values, which results in a bit savings. As such, employing separate overlapping value spaces for APSs of different types increases coding efficiency and hence reduces the usage of network resources, memory resources, and/or processing resources at the encoder and the decoder.

In a third example, LMCS parameters are included in an LMCS APS. As noted above, LMCS/reshaper parameters may change about once a second. Video sequences may display thirty to sixty pictures per second. As such, LMCS parameters may not change for thirty to sixty frames. Including LMCS parameters in an LMCS APS significantly reduces redundant coding of LMCS parameters. A slice header and/or a picture header associated with a slice can refer to the relevant LMCS APS. In this way, the LMCS parameters are only encoded when the LMCS parameters for a slice change. Accordingly, employing an LMCS APS to encode LMCS parameters increases coding efficiency and hence reduces the usage of network resources, memory resources, and/or processing resources at the encoder and the decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
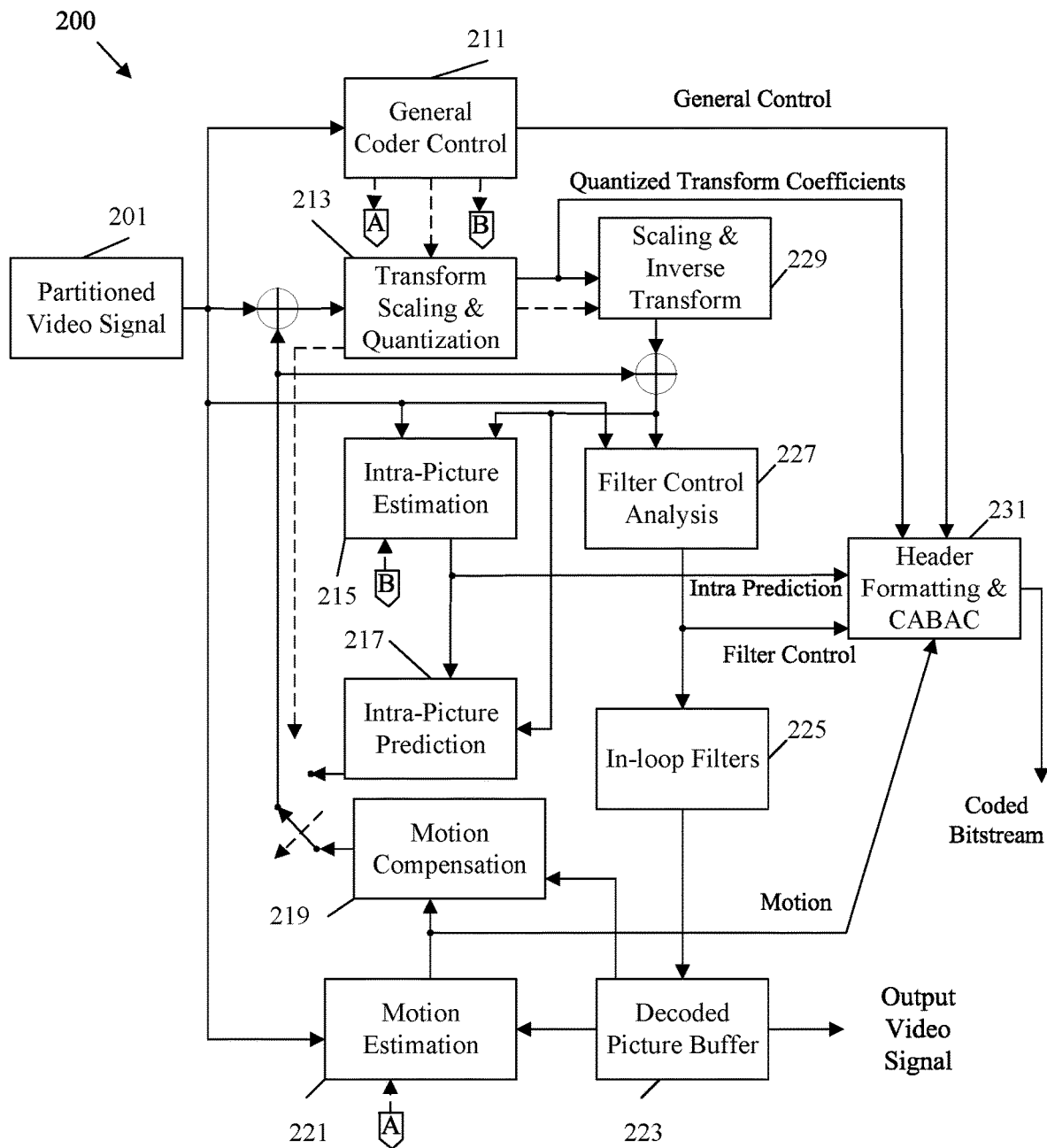
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
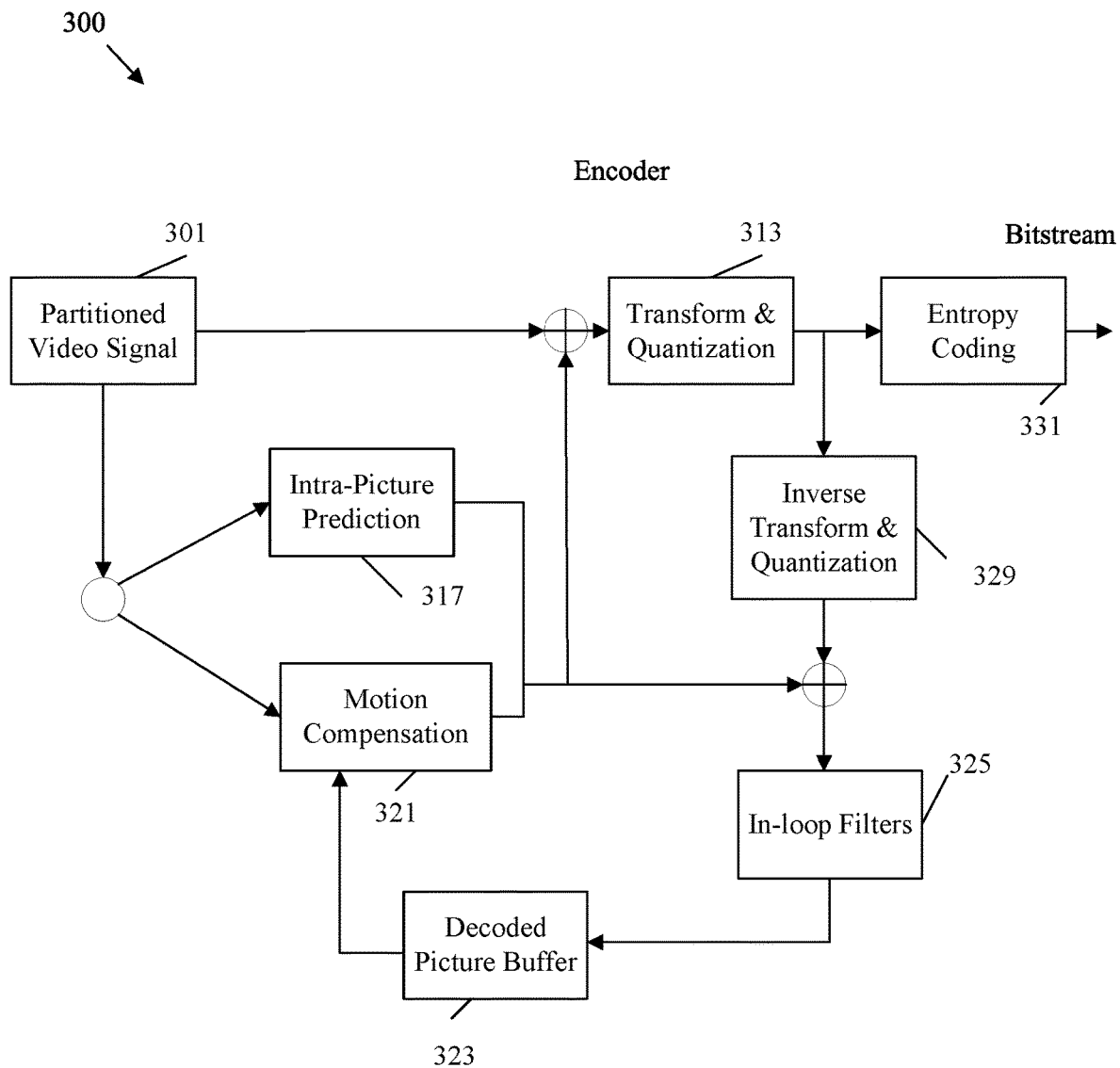
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream.

The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
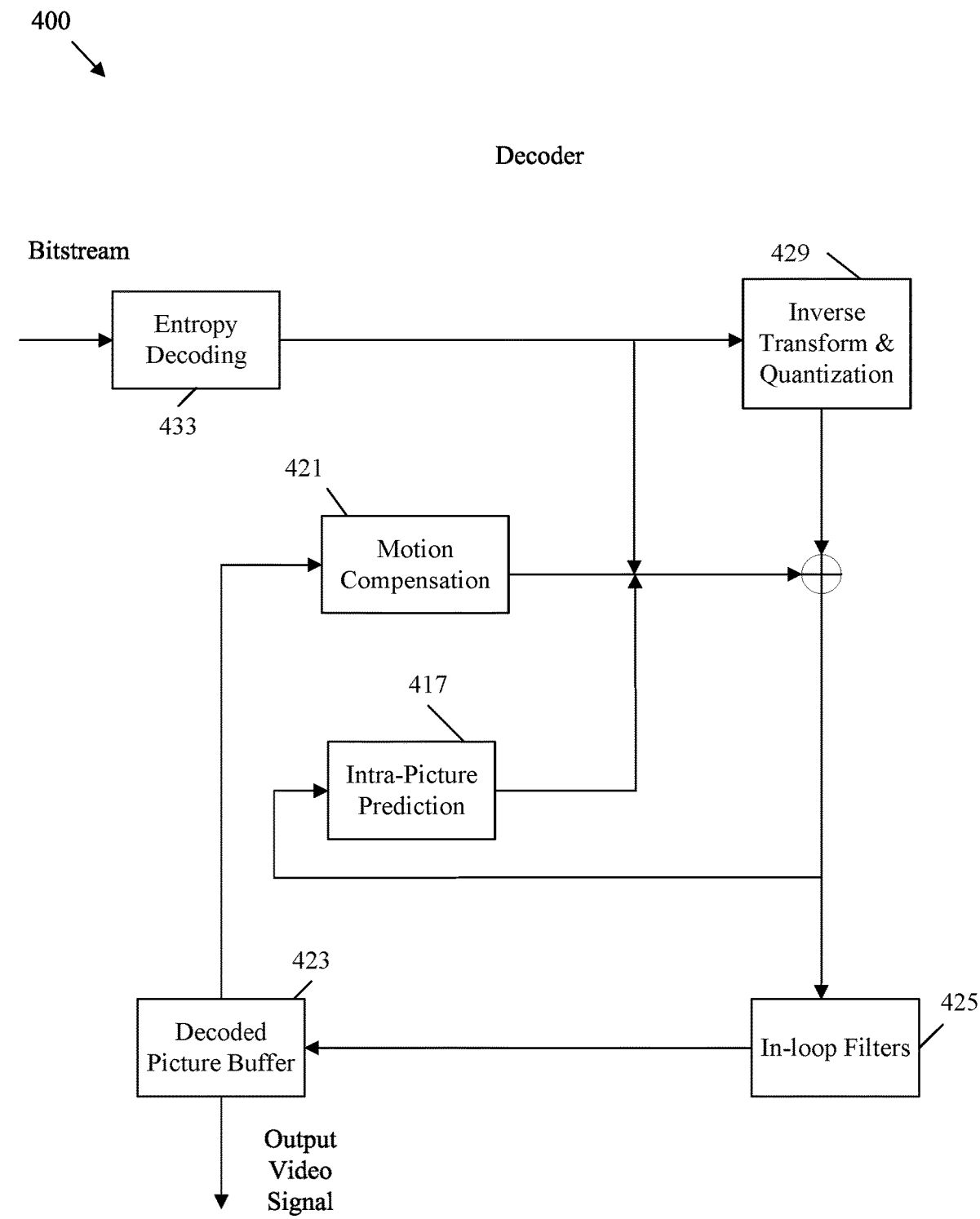
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
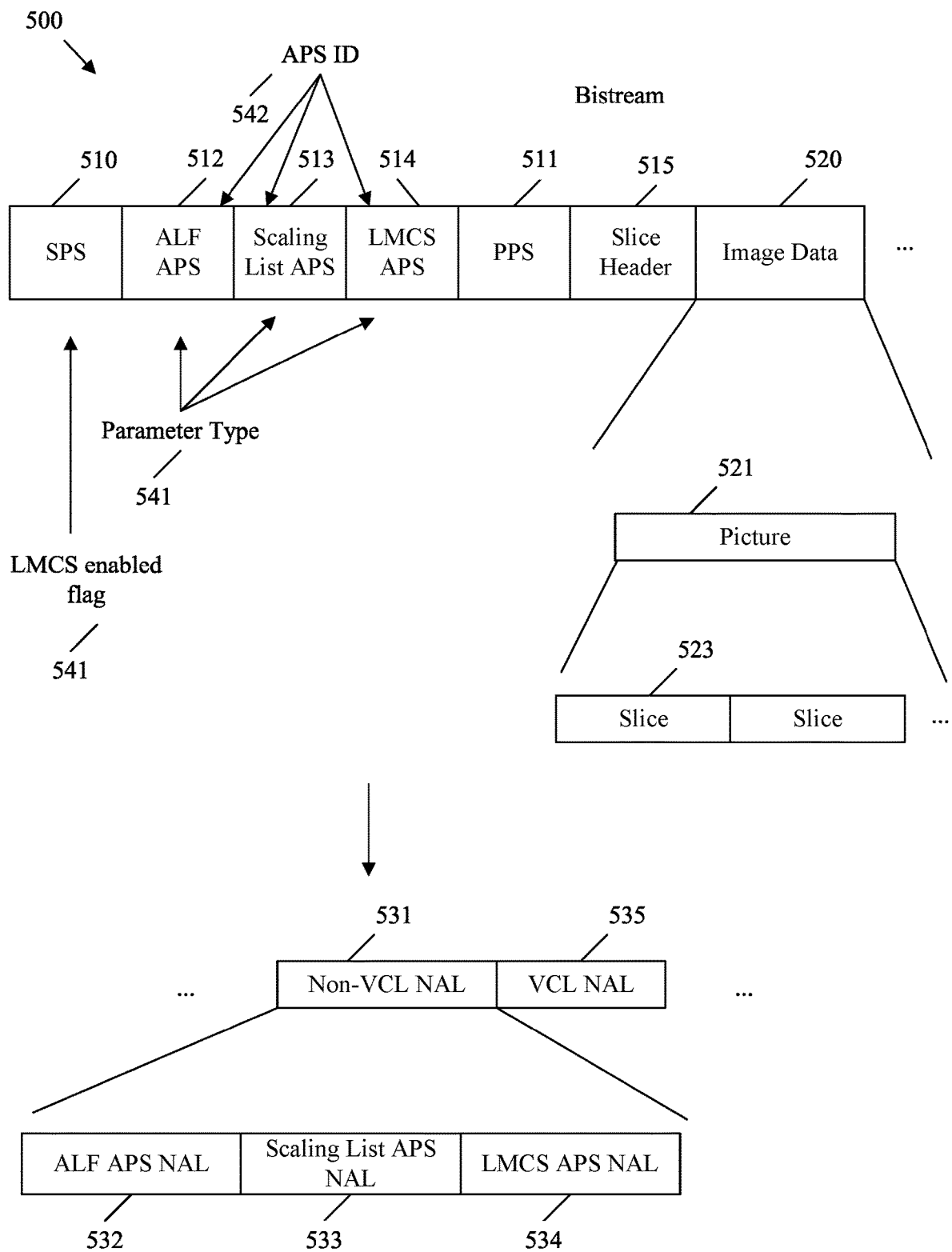
FIG. 5 is a schematic diagram illustrating an example bitstream containing multiple types of adaptation parameter sets (APSs) including different types of coding tool parameters.

FIG. 5 is a schematic diagram illustrating an example bitstream 500 containing multiple types of APSs including different types of coding tool parameters. For example, the bitstream 500 can be generated by a codec system 200 and/or an encoder 300 for decoding by a codec system 200 and/or a decoder 400. As another example, the bitstream 500 may be generated by an encoder at step 109 of method 100 for use by a decoder at step 111.

The bitstream 500 includes a sequence parameter set (SPS) 510, a plurality of picture parameter sets (PPSs) 511, a plurality of ALF APSs 512, a plurality of scaling list APSs 513, a plurality of LMCS APSs 514, a plurality of slice headers 515, and image data 520. An SPS 510 contains sequence data common to all the pictures in the video sequence contained in the bitstream 500. Such data can include picture sizing, bit depth, coding tool parameters, bit rate restrictions, etc. The PPS 511 contains parameters that apply to an entire picture. Hence, each picture in the video sequence may refer to a PPS 511. It should be noted that, while each picture refers to a PPS 511, a single PPS 511 can contain data for multiple pictures in some examples. For example, multiple similar pictures may be coded according to similar parameters. In such a case, a single PPS 511 may contain data for such similar pictures. The PPS 511 can indicate coding tools available for slices in corresponding pictures, quantization parameters, offsets, etc. The slice header 515 contains parameters that are specific to each slice in a picture. Hence, there may be one slice header 515 per slice in the video sequence. The slice header 515 may contain slice type information, picture order counts (POCs), reference picture lists, prediction weights, tile entry points, deblocking parameters, etc. It should be noted that a slice header 515 may also be referred to as a tile group header in some contexts.

An APS is a syntax structure containing syntax elements that apply to one or more pictures 521 and/or slices 523. In the example shown, an APS can be seperated into multiple types. An ALF APS 512 is an APS of type ALF that includes ALF parameters. An ALF is an adaptive block based filter that includes a transfer function controlled by varible parameters and employs feedback from a feedback loop to refine the transfer function. Further, the ALF is employed to correct coding artifacts (e.g., errors) that occur as a result of block based coding. An adaptive filter is a linear filter with a transfer function controller by variable parameters that can be controlled by an optimization algorithm, such as the RDO process operating at the encoder. As such, ALF parameters included in an ALF APS 512 may include variable parameters selected by the encoder to cause the filter to remove block based coding artifacts during decoding at the decoder.

A scaling list APS 513 is an APS of type scaling list that includes scaling list parameters. As discussed above, a current block is coded according to inter-prediction or intra-prediction which results in a residual. The residual is the difference between the luma and/or chroma values of the block and corresponding values of the prediction block. A transform is then applied to the residual to convert the residual into transform coefficients (which are smaller than the residual values). Encoding high definition and/or ultra high definition content may result in increased residual data. A simple transform process may result in significant quantization noise when applied to such data. As such, scaling list parameters included in an scaling list APS 513 may include weighting parameters that can be applied to scale the transform matrices to account for variations in display resolutions and/or acceptable levels of quantization noise in a resulting decoded video image.

An LMCS APS 514 is an APS of type LMCS that includes LMCS parameters, which are also known as reshaper parameters. The human visual system is less capable of distinguishing differences in color (e.g., chrominance) than differences in light (e.g., luminance). As such, some video systems use a chroma sub-sampling mechanism to compress video data by reducing the resolution of chroma values without adjusting the corresponding luma values. One concern with such mechanisms is that associated interpolation can produce interpolated chroma values during decoding that are incompatible with corresponding luma values in some locations. This creates color artifacts at such locations, which should be corrected by corresponding filters. This is complicated by luma mapping mechanisms. Luma mapping is the process of remapping coded luma components across a dynamic range of an input luma signal (e.g., according to a peicewise linear function). This compresses the luma components. LMCS algorithms scale the compressed chroma values based on the luma mappings to remove artefacts related to chroma sub-sampling. As such, LMCS parameters included in a LMCS APS 514 indicate the chroma scaling used to account for luma mapping. The LMCS parameters are determined by the encoder and can be employed by the decoder to filter out artifacts caused by chroma sub-sampling in when luma mapping is employed.

The image data 520 contains video data encoded according to inter-prediction and/or intra-prediction as well as corresponding transformed and quantized residual data. For example, a video sequence includes a plurality of pictures 521 coded as image data. A picture 521 is a single frame of a video sequence and hence is generally displayed as a single unit when displaying the video sequence. However, partial pictures may be displayed to implement certain technologies such as virtual reality, picture in picture, etc. The pictures 521 each reference a PPS 511. The pictures 521 are divided into slices 523. A slice 523 may be defined as a horizontal section of a picture 521. For example, a slice 523 may contain a portion of the height of the picture 521 and the complete width of the picture 521. In other cases, the picture 521 may be divided into columns and rows and a slice 523 may be included in a rectangular portion of the picture 521 created by such columns and rows. In some systems the slices 523 are sub-divided into tiles. In other systems, the slices 523 are referred to as tile groups containing the tiles. The slices 523 and/or tile groups of tiles reference a slice header 515. The slices 523 are further divided into coding tree units (CTUs). The CTUs are further divided into coding blocks based on coding trees. The coding blocks can then be encoded/decoded according to prediction mechanisms.

The picture 521 and/or the slice 523 may refer, directly or indirectly, to an ALF APS 512, the scaling list APS 513, and/or the LMCS APS 514 containing relevant parameters. For example, a slice 523 may refer to a slice header 515. Further, a picture 521 may refer to a corresponding picture header. The slice header 515 and/or picture header may refer to the ALF APS 512, the scaling list APS 513, and/or the LMCS APS 514 containing parameters used in coding the relevant slice 523 and/or picture 521. In this way, a decoder can obtain the coding tool parameters that are relevant to a slice 523 and/or picture 521 according header references related to the corresponding slice 523 and/or picture 521.

The bitstream 500 is coded into video coding layer (VCL) NAL units 535 and non-VCL NAL units 531. A NAL unit is a coded data unit sized to be placed as a payload for a single packet for transmission over a network. A VCL NAL unit 535 is a NAL unit that contains coded video data. For example, each VCL NAL unit 535 may contain one slice 523 and/or tile group of data, CTUs, and/or coding blocks. A non-VCL NAL unit 531 is a NAL unit that contains supporting syntax, but does not contain coded video data. For example, a non-VCL NAL unit 531 may contain the SPS 510, a PPS 511, an APS, a slice header 515, etc. As such, the decoder receives the bitstream 500 in discrete VCL NAL units 535 and non-VCL NAL units 531. An access unit is a group of VCL NAL units 535 and/or non-VCL NAL units 531 that include data sufficient to code a single picture 521.

In some examples, the ALF APS 512, the scaling list APS 513, and the LMCS APS 514 are each assigned to a separate non-VCL NAL unit 531 type. In such a case, the ALF APS 512, the scaling list APS 513, and the LMCS APS 514 are included in an ALF APS NAL unit 532, a scaling list APS NAL unit 533, and a LMCS APS NAL unit 534, respectively. Accordingly, an ALF APS NAL unit 532 contains ALF parameters that remain in force until another ALF APS NAL unit 532 is received. Further, a scaling list APS NAL unit 533 contains scaling list parameters that remain in force until another scaling list APS NAL unit 533 is received. In addition, a LMCS APS NAL unit 534 contains LMCS parameters that remain in force until another LMCS APS NAL unit 534 is received. In this way, there is no need to issue a new APS each time an APS parameter changes. For example, a change in LMCS parameters results in an additional LMCS APS 514, but does not result in an additional ALF APS 512 or scaling list APS 513. Accordingly, by separating APSs into different NAL unit types based on parameter type, redundant signaling of unrelated parameters is avoided. As such, separating APSs into different NAL unit types increases coding efficiency, and hence decreases usage of processor, memory, and/or network resources at the encoder and the decoder.

Further, a slice 523 and/or a picture 521 may directly or indirectly reference an ALF APS 512, ALF APS NAL unit 532, scaling list APS 513, scaling list APS NAL unit 533, LMCS APS 514, and/or an LMCS APS NAL unit 534 containing coding tool parameters employed to code the slice 523 and/or a picture 521. For example, each APS may contain an APS ID 542 and a parameter type 541. The APS ID 542 is a value (e.g., a number) that identifies the corresponding APS. The APS ID 542 may contain a predefined number of bits. Therefore, the APS ID 542 may increase according to a predefined sequence (e.g., increase by one) and may reset at a minimum value (e.g., zero) once the sequence reaches the end of a predefined range. The parameter type 541 indicates the type of parameters contained in the APS (e.g., ALF, scaling list, and/or LMCS). For example, the parameter type 541 may include an APS parameter type (aps_params_type) code set to a predefined value indicating a type of parameters included in each APS. As such, the parameter type 541 can be used to distinguish between an ALF APS 512, a scaling list APS 513, and an LMCS APS 514. In some examples, the ALF APS 512, the scaling list APS 513, and the LMCS APS 514 can each be uniquely identified by a combination of a parameter type 541 and an APS ID 542. For example, each APS type may include a separate value space for corresponding APS IDs 542. Hence, each APS type may include an APS ID 542 that increases in sequence based on a previous APS of the same type. However, the APS ID 542 for a first APS type may not be related to an APS ID 542 for a previous APS of a different second APS type. As such, APS IDs 542 for different APS types may include value spaces that overlap. For example, an APS of a first type (e.g., an ALF APS) can include the same APS ID 542 as an APS of a second type (e.g., a LMCS APS) in some cases. By allowing each APS type to include a different value space, the codec does not need to check across APS types for APS ID 542 conflicts. Further, by allowing the value spaces to overlap, the codec can avoid employing larger APS ID 542 values, which results in a bit savings. As such, employing separate overlapping value spaces for APS IDs 542 of different APS types increases coding efficiency and hence reduces the usage of network resources, memory resources, and/or processing resources at the encoder and the decoder. As noted above, the APS ID 542 may extend over a predefined range. In some examples, the predefined range of the APS ID 542 may vary depending on the APS type indicated by the parameter type 541. This may allow for a different number of bits to be assigned to different APS types depending on how often parameters of different types generally change. For example, the APS IDs 542 of the ALF APS 512 may have a range of zero to seven, the APS IDs 542 of the scaling list APS 513 may have a range of zero to seven, and the APS IDs 542 of the LMCS APS 514 may have a range of zero to three.

In another example, LMCS parameters are included in the LMCS APS 514. Some systems include LMCS parameters in a slice header 515. However, LMCS/reshaper parameters may change about once a second. Video sequences may display thirty to sixty pictures 521 per second. As such, LMCS parameters may not change for thirty to sixty frames. Including LMCS parameters into an LMCS APS 514 significantly reduces redundant coding of LMCS parameters. In some examples, a slice header 515 and/or a picture header associated with a slice 523 and/or picture 521, respectively can reference the relevant LMCS APS 514. The slice 523 and/or picture 521 then reference the slice header 515 and/or a picture header. This allows the decoder to obtain the LMCS parameters for the associated slice 523 and/or picture 521. In this way, the LMCS parameters are only encoded when the LMCS parameters for a slice 523 and/or picture 521 change. Accordingly, employing an LMCS APS 514 to encode LMCS parameters increases coding efficiency and hence reduces the usage of network resources, memory resources, and/or processing resources at the encoder and the decoder. As LMCS is not employed for all videos, the SPS 510 may include a LMCS enabled flag 543. The LMCS enabled flag 543 can be set to indicate LMCS is enabled for an encoded video sequence. As such, the decoder may obtain the LMCS parameters from the LMCS APS 514 based on the LMCS enabled flag 543 when the LMCS enabled flag 543 is set (e.g., to one). Further, the decoder may not attempt to obtain LMCS parameters when the LMCS enabled flag 543 is not set (e.g., to zero).

Figure 6:
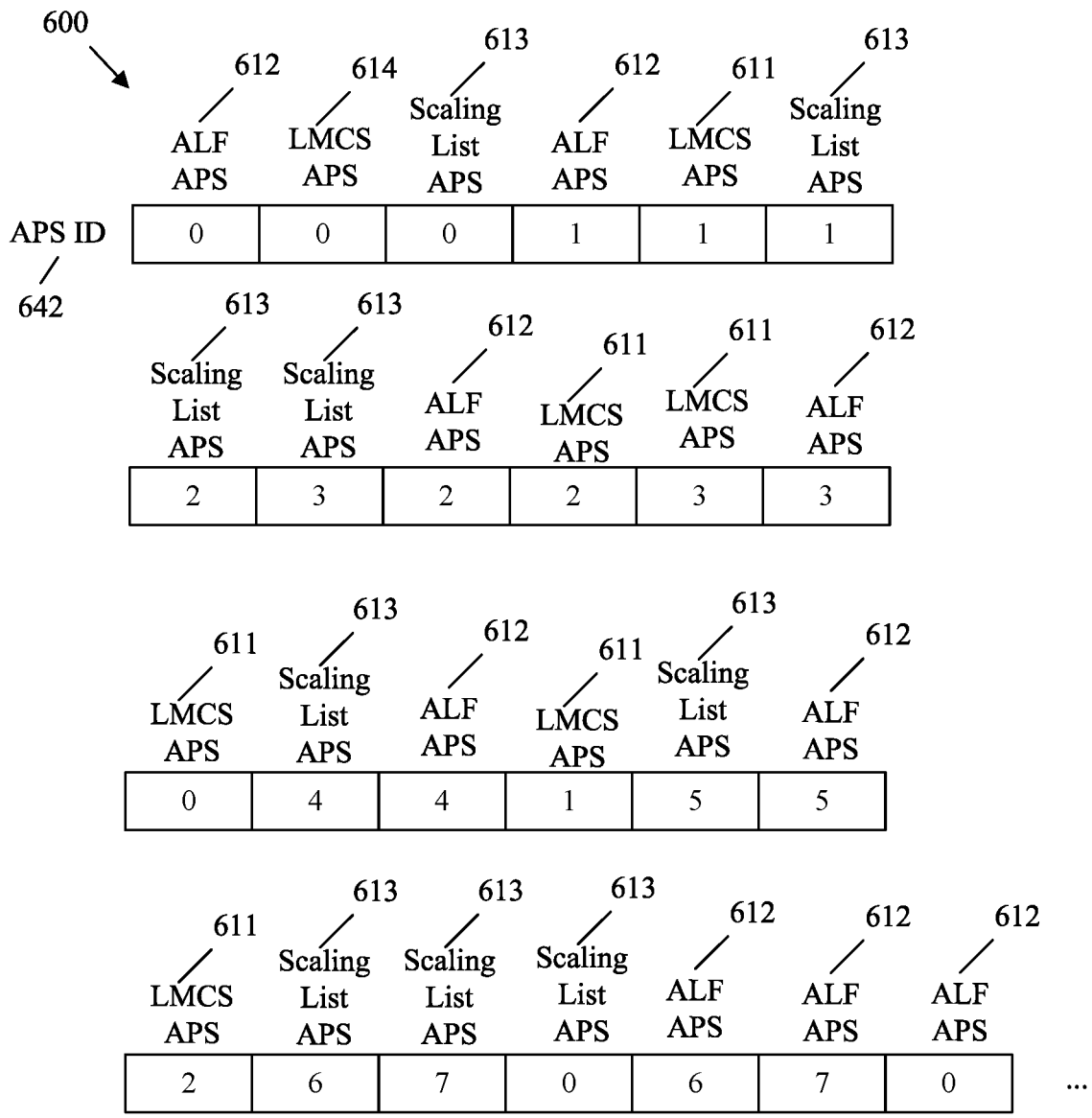
FIG. 6 is a schematic diagram illustrating an example mechanism for assigning APS identifiers (IDs) to different APS types over different value spaces.

FIG. 6 is a schematic diagram illustrating an example mechanism 600 for assigning APS IDs 642 to different APS types over different value spaces. For example, mechanism 600 can be applied to a bitstream 500 to assign APS IDs 542 to ALF APS 512, scaling list APS 513, and/or LMCS APS 514. Further, mechanism 600 may be applied to a codec 200, an encoder 300, and/or a decoder 400 when coding a video according to method 100.

Mechanism 600 assigns APS IDs 642 to ALF APS 612, scaling list APS 613, and LMCS APS 614, which may be substantially similar to APS IDs 542, ALF APS 512, scaling list APS 513, and LMCS APS 514, respectively. As noted above, the APS ID 642 may be assigned in sequence over a plurality of different value spaces where each value space is specific to the APS type. A value space is a defined set of values, such as integer values, available for use for a corresponding purpose, such as for use in uniquely identifying an APS. Each value space may extend over a different range that is specific to the APS type. In the example shown, the range of the value space of the APS ID 642 for the ALF APS 612 is from zero to seven (e.g., three bits). Further, the range of the value space of the APS ID 642 for the scaling list APS 613 is from zero to seven (e.g., three bits). Also, the range of the value space of the APS ID 642 for the LMCS APS 611 is from zero to three (e.g., two bits). When an APS ID 642 reaches the end of the value space range, the APS ID 642 of the next APS of the corresponding type returns to the start of the range (e.g., zero). When a new APS receives the same APS ID 642 as a previous APS of the same type, the previous APS is no longer active and can no longer be referenced. As such, the range of a value space can be expanded to allow for more APSs of a type to be actively referenced. Further, the range of a value space can be reduced for increased coding efficiency, but such reduction also reduces the number of APSs of the corresponding type that can simultaneously remain active and available for referencing.

In the example shown, each ALF APS 612, scaling list APS 613, and LMCS APS 614 are referenced by a combination of APS ID 642 and APS type. For example, the ALF APS 612, the LMCS APS 614, and the scaling list APS 613 each receive an APS ID 642 of zero. When a new ALF APS 612 is received, the APS ID 642 is incremented from the value used for the previous ALF APS 612. The same sequence applies for the scaling list APS 613 and LMCS APS 614. Accordingly, each APS ID 642 is related to the APS ID 642 for previous APSs of the same type. However, the APS ID 642 is not related to an APS ID 642 of previous APSs of other types. In this example, the APS ID 642 of the ALF APS 612 increase incrementally from zero to seven and then return to zero before continuing to increment. Further, the APS ID 642 of the scaling list APS 613 increase incrementally from zero to seven and then return to zero before continuing to increment. Also, the APS ID 642 of the LMCS APS 611 increase incrementally from zero to three and then return to zero before continuing to increment. As shown, such value spaces are overlapping as different APSs of different APS types can share the same APS ID 642 at the same point in the video sequence. It should also be noted that mechanism 600 only depicts the APS. In a bitstream, the APS depicted would be interspersed between other VCL and non-VCL NAL units, such as an SPS, PPS, slice header, picture header, slices, etc.

As such, the present disclosure includes improvements to the design of the APS as well as some improvements for signaling of the reshaper/LMCS parameters. The APS is designed for signaling of information that can be shared by multiple pictures and can include many variations. The reshaper/LMCS parameters are employed for an adaptive in-loop reshaper/LMCS video coding tool. The preceding mechanisms can be implemented as follows. In order to solve the problems listed herein, this includes several aspects that can be employed individually and/or in combination.

The disclosed APS is modified such that multiple APSs can be used to carry different types of parameters. Each APS NAL unit is used to carry only one type of parameters. Consequently, two APS NAL units are encoded when two types of information are carried for a particular tile group/slice (e.g., one for each type of information). The APS may include an APS parameters type field in the APS syntax. Only parameters of the type indicated by the APS parameters type field can be included in the APS NAL unit.

In some examples, different types of APS parameters are indicated by different NAL unit types. For example, two different NAL unit types are used for APS. The two types of APSs may be referred to as ALF APS and reshaper APS, respectively. In another example, a type of tool parameters that is carried in an APS NAL unit is specified in the NAL unit header. In VVC, a NAL unit header has reserved bits (e.g., seven bits denoted as nuh_reserved_zero_7 bits). In some examples, some of these bits (e.g., three bits out of the seven bits) may be used for specifying an APS parameter type field. In some examples, APSs of a particular type may share the same value space for the APS IDs. Meanwhile, different types of APSs use different value spaces of the APS ID. Accordingly, two APSs of different types may co-exist and have the same value of APS ID at the same instant. Further, the combination of APS ID and APS parameters type may be employed to identify an APS from other APSs.

The APS ID may be included in the tile group header syntax when a corresponding coding tool is enabled for the tile group. Otherwise the APS ID of the corresponding type may not be included in the tile group header. For example, when ALF is enabled for a tile group, the APS ID of the ALF APS is included in the tile group header. For example, this can be accomplished by setting the APS parameters type field to indicate the ALF type. Accordingly, when ALF is not enabled for the tile group, the APS ID of the ALF APS is not included in the tile group header. Further, when a reshaper coding tool is enabled for a tile group, the APS ID of the reshaper APS is included in the tile group header. For example, this can be accomplished by setting the APS parameters type field to indicate the reshaper type. Further, when the reshaper coding tool is not enabled for the tile group, the APS ID of the reshaper APS may not be included in the tile group header.

In some examples, the presence of APS parameters type information in an APS may be conditioned by the use of coding tools associated with the parameters. When only one APS related coding tool is enabled for a bitstream (e.g., LMCS, ALF, or scaling list), APS parameters type information may be not present and may instead be inferred. For example, when an APS can contains parameters for ALF and reshaper coding tools but only ALF is enabled (e.g., as specified by a flag in the SPS) and reshaper is not enabled (e.g., as specified by a flag in the SPS), the APS parameter type may not be signaled and can be inferred to be equal to ALF parameters.

In another example, APS parameter type information can be inferred from the APS ID value. For example, a predefined APS ID value range can be associated with a corresponding APS parameter type. This aspect can be implemented as follows. Instead of assigning X bits for signaling an APS ID and Y bits for signaling APS parameters type, X+Y bits can be assigned for signaling the APS ID. The different ranges of the value of the APS ID can then be specified to indicate different types of APS parameter types. For example, instead of using five bits for signaling an APS ID and three bits for signaling an APS parameters type, eight bits can be assigned for signaling an APS ID (e.g., without increasing bit costs). The APS ID value range from zero to sixty three indicates the APS contains parameters for ALF, the ID value range from sixty four to ninety five indicates the APS contains parameters for reshaper, and from ninety six to two hundred fifty five can be reserved for other parameters types, such as scaling list. In another example, the APS ID value range from zero to thirty one indicates the APS contains parameters for ALF, the ID value range from thirty two to forty seven indicates the APS contains parameters for reshaper, and from forty eight to two hundred fifty five can be reserved for other parameters types, such as scaling list. The advantage of this approach is that the APS ID range can be assigned depending on the frequency of the parameter changes of each tool. For example, ALF parameters may be expected to change more frequently than reshaper parameters. In such a case, a larger APS ID range may be employed for indicating an APS is an APS containing ALF parameter.

In a first example, one or more of the preceding aspects may be implemented as follows. An ALF APS may be defined as an APS that has aps_params_type equal to ALF_APS. A reshaper APS (or LMCS APS) may be defined as an APS that has aps_params_type equal to MAP_APS. An example SPS syntax and semantics are as follows.

|  | Descriptor |
|---|---|
| seq_parameter_set_rbsp( ) { | |
| ... | |
| sps_reshaper_enabled_flag | u(1) |
| ... | |
| } | |

The sps_reshaper_enabled_flag is set equal to one to specify that reshaper is used in the coded video sequence (CVS). The sps_reshaper_enabled_flag is set equal to zero to specify that reshaper is not used in the CVS.

An example APS syntax and semantics are as follows.

|  | Descriptor |
|---|---|
| adaptation_parameter_set_rbsp( ) { | |
| adaptation_parameter_set_id | u(5) |
| aps_params_type | u(3) |
| if( aps_params_type = = ALF_APS ) // 0 | |
| alf_data( ) | |
| else if ( aps_params_type = = MAP_APS ) // 1 | |
| reshaper_data( ) | |
| aps_extension_flag | u(1) |
| if( aps_extension_flag ) | |
| while( more_rbsp_data( ) ) | |
| aps_extension_data_flag | u(1) |
| rbsp_trailing_bits( ) | |
| } | |

The aps_params_type specifies the type of APS parameters carried in the APS as specified in the following table.

TABLE 1

APS parameters type codes and types of APS parameters

| aps_params_type | Name of aps_params_type | Type of APS parameters |
|---|---|---|
| 0 | ALF_APS | ALF parameters |
| 1 | MAP_APS | In-loop mapping (i.e., reshaper) parameters |
| 2..7 | Reserved | Reserved |

An example tile group header syntax and semantics is as follows.

|  | Descriptor |
|---|---|
| tile_group_header( ) { | |
| ... | |
| if( sps_alf_enabled_flag ) { | |
| tile_group_alf_enabled_flag | u(1) |
| if( tile_group_alf_enabled_flag ) | |
| tile_group_alf_aps_id | u(5) |
| } | |
| ... | |
| if( sps_reshaper_enabled_flag) { | |
| tile_group_reshaper_enable_flag | u(1) |
| tile_group_reshaper_aps_id | u(5) |
| if( tile_group_reshaper_enable_flag && ( ! ( qtbtt_dual_tree_intra_flag && | |
| tile_group_type = = I ) ) ) | |
| tile_group_reshaper_chroma_residual_scale_flag | u(1) |
| } | |
| ... | |
| if( NumTilesInCurrTileGroup > 1 ) { | |
| offset_len_minus1 | ue(v) |
| for( i = 0; i < NumTilesInCurrTileGroup − 1; i++ ) | |
| entry_point_offset_minus1[i] | u(v) |
| } | |
| byte_alignment( ) | |
| } | |

The tile_group_alf_aps_id specifies the adaptation_parameter_set_id of the ALF APS that the tile group refers to. The TemporalId of the ALF APS NAL unit having adaptation_parameter_set_id equal to tile_group_alf_aps_id shall be less than or equal to the TemporalId of the coded tile group NAL unit. When multiple ALF APSs with the same value of adaptation_parameter_set_id are referred to by two or more tile groups of the same picture, the multiple ALF APSs with the same value of adaptation_parameter_set_id shall have the same content.

The tile_group_reshaper_enabled_flag is set equal to one to specify that reshaper is enabled for the current tile group. The tile_group_reshaper_enabled_flag is set equal to zero to specify that reshaper is not enabled for the current tile group. When tile_group_reshaper_enable_flag is not present, the flag is inferred to be equal to zero. The tile_group_reshaper_aps_id specifies the adaptation_parameter_set_id of the reshaper APS that the tile group refers to. The TemporalId of the reshaper APS NAL unit having adaptation_parameter_set_id equal to tile_group_reshaper_aps_id shall be less than or equal to the TemporalId of the coded tile group NAL unit. When multiple reshaper APSs with the same value of adaptation_parameter_set_id are referred to by two or more tile groups of the same picture, the multiple reshaper APSs with the same value of adaptation_parameter_set_id shall have the same content. The tile_group_reshaper_chroma_residual_scale_flag is set equal to one to specify that chroma residual scaling is enabled for the current tile group. The tile_group_reshaper_chroma_residual_scale_flag is set equal to zero to specify that chroma residual scaling is not enabled for the current tile group. When tile_group_reshaper_chroma_residual_scale_flag is not present, the flag is inferred to be equal to zero.

An example reshaper data syntax and semantics is as follows.

| | Descriptor |
|---|---|
| reshaper_data( ) { | |
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx; i++) { | |
|     reshaper_model_bin_delta_abs_CW[ i ] | u(v) |
|     if( reshaper_model_bin_delta_abs_CW[ i ] ) > 0) | |
|       reshaper_model_bin_delta_sign_CW_flag[ i ] | u(1) |
|   } | |
| } | |

The reshaper_model_min_bin_idx specifies the minimum bin (or piece) index to be used in the reshaper construction process. The value of reshaper_model_min_bin_idx shall be in the range of zero to MaxBinIdx, inclusive. The value of MaxBinIdx shall be equal to fifteen. The reshaper_model_delta_max_bin_idx specifies the maximum allowed bin (or piece) index MaxBinIdx minus the maximum bin index to be used in the reshaper construction process. The value of reshaper_model_max_bin_idx is set equal to MaxBinIdx−reshaper_model_delta_max_bin_idx. The reshaper_model_bin_delta_abs_cw_prec_minus1 plus 1 specifies the number of bits used for the representation of the syntax element reshaper_model_bin_delta_abs_CW[i]. The reshaper_model_bin_delta_abs_CW[i] specifies the absolute delta codeword value for the i-th bin. The reshaper_model_bin_delta_abs_CW[i] syntax element is represented by reshaper_model_bin_delta_abs_cw_prec_minus1+1 bits. The reshaper_model_bin_delta_sign_CW_flag[i] specifies the sign of reshaper_model_bin_delta_abs_CW[i].

In a second example, one or more of the preceding aspects may be implemented as follows. An example SPS syntax and semantics is as follows.

| | Descriptor |
|---|---|
| seq_parameter_set_rbsp( ) { | |
| ... | |
|   sps_alf_enabled_flag | u(1) |
| ... | |
|   sps_reshaper_enabled_flag | u(1) |
| ... | |
| } | |

The variable ALFEnabled and ReshaperEnabled are set as follows. ALFEnabled=sps_alf_enabled_flag and ReshaperEnabled=sps_reshaper_enabled_flag.

An example APS syntax and semantics are as follows.

| | Descriptor |
|---|---|
| adaptation_parameter_set_rbsp( ) { | |
|   adaptation_parameter_set_id | u(5) |
|   if( ALFEnabled && ReshaperEnabled ) | |
|     aps_params_type | u(3) |
|   if( aps_params_type = = ALF_APS ) // 0 | |
|     alf_data( ) | |
|   else if ( aps_params_type = = MAP_APS ) // 1 | |
|     reshaper_data( ) | |

-continued

| | Descriptor |
|---|---|
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

The aps_params_type specifies the type of APS parameters carried in the APS as specified in the following table.

TABLE 2

APS parameters type codes and types of APS parameters

| aps_params_type | Name of aps_params_type | Type of APS parameters |
|---|---|---|
| 0 | ALF APS | ALF parameters |
| 1 | MAP APS | In-loop mapping (i.e., reshaper) parameters |
| 2..7 | Reserved | Reserved |

When not present, the value of aps_params_type is inferred as follows. If ALFEnabled, aps_params_type is set to be equal to zero. Else, aps_params_type is set to be equal to one.

In a second example, one or more of the preceding aspects may be implemented as follows. An example SPS syntax and semantics is as follows.

| | Descriptor |
|---|---|
| adaptation_parameter_set_rbsp( ) { | |
|   adaptation_parameter_set_id | u(8) |
|   if( ApsParamsType = = ALF_APS ) // 0 | |
|     alf_data( ) | |
|   else if (ApsParamsType = = MAP_APS ) // 1 | |
|     reshaper_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

The adaptation_parameter_set_id provides an identifier for the APS for reference by other syntax elements. APSs can be shared across pictures and can be different in different tile groups within a picture. The value and description of the variable APSParamsType is defined in the following table.

TABLE 3

APS parameters type codes and types of APS parameters

| APS ID range | ApsParamsType | Type of APS parameters |
|---|---|---|
| 0~63 | 0: ALF_APS | ALF parameters |
| 64~95 | 1: MAP_APS | In-loop mapping (i.e., reshaper) parameters |
| 96..255 | Reserved | Reserved |

An example tile group header semantics is as follows. The tile_group_alf_aps_id specifies the adaptation_parameter_set_id of the ALF APS that the tile group refers to. The TemporalId of the ALF APS NAL unit having adaptation_parameter_set_id equal to tile_group_alf_aps_id shall be less than or equal to the TemporalId of the coded tile group NAL unit. The value of tile_group_alf_aps_id shall be in the range of zero to sixty three, inclusive.

When multiple ALF APSs with the same value of adaptation_parameter_set_id are referred to by two or more tile groups of the same picture, the multiple ALF APSs with the same value of adaptation_parameter_set_id shall have the same content. The tile_group_reshaper_aps_id specifies the adaptation_parameter_set_id of the reshaper APS that the tile group refers to. The TemporalId of the reshaper APS NAL unit having adaptation_parameter_set_id equal to tile_group_reshaper_aps_id shall be less than or equal to the TemporalId of the coded tile group NAL unit. The value of tile_group_reshaper_aps_id shall be in the range of sixty four to ninety five, inclusive. When multiple reshaper APSs with the same value of adaptation_parameter_set_id are referred to by two or more tile groups of the same picture, the multiple reshaper APSs with the same value of adaptation_parameter_set_id shall have the same content.

Figure 7:
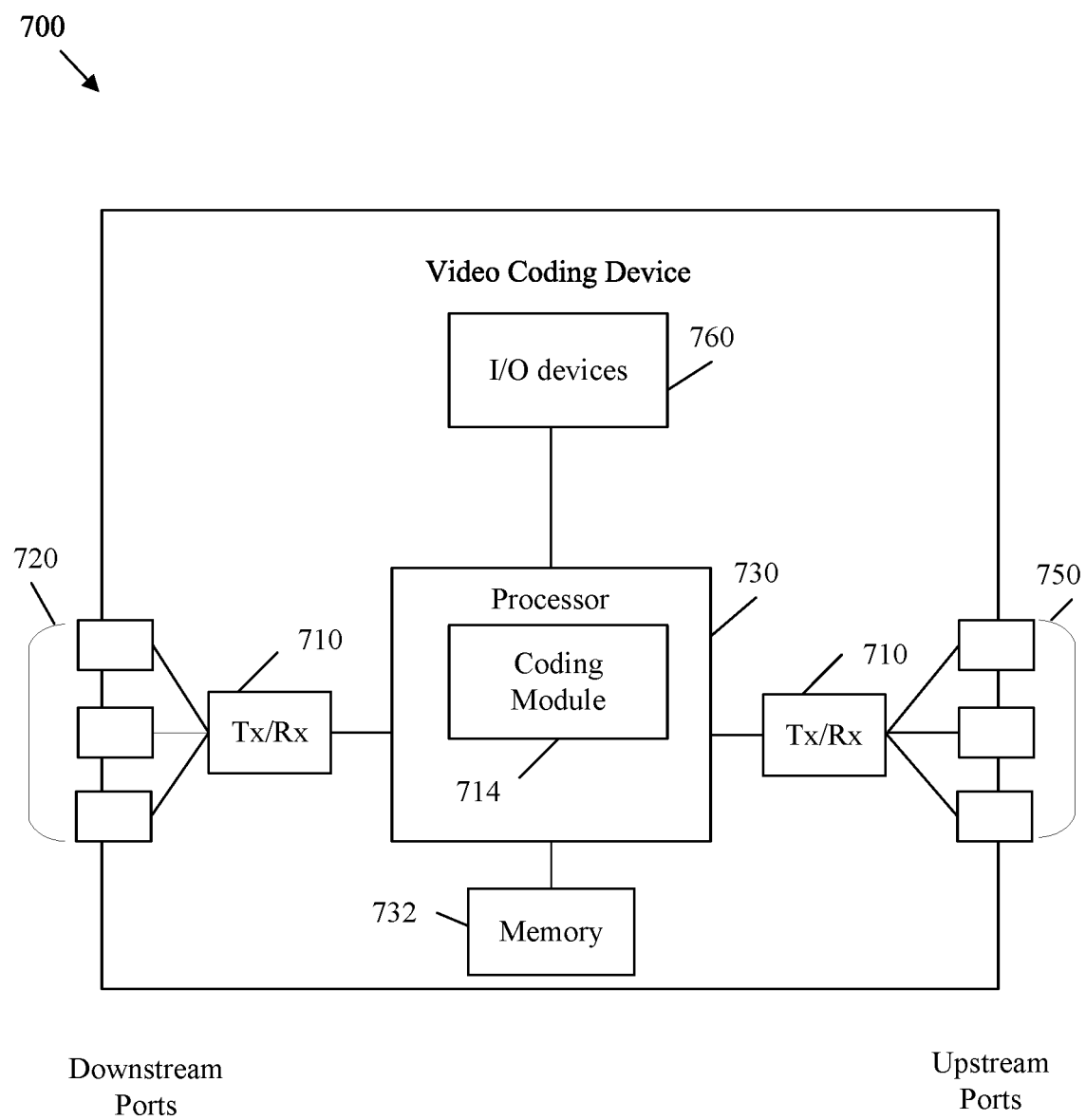
FIG. 7 is a schematic diagram of an example video coding device.

FIG. 7 is a schematic diagram of an example video coding device 700. The video coding device 700 is suitable for implementing the disclosed examples/embodiments as described herein. The video coding device 700 comprises downstream ports 720, upstream ports 750, and/or transceiver units (Tx/Rx) 710, including transmitters and/or receivers for communicating data upstream and/or downstream over a network. The video coding device 700 also includes a processor 730 including a logic unit and/or central processing unit (CPU) to process the data and a memory 732 for storing the data. The video coding device 700 may also comprise electrical, optical-to-electrical (OE) components, electrical-to-optical (EO) components, and/or wireless communication components coupled to the upstream ports 750 and/or downstream ports 720 for communication of data via electrical, optical, or wireless communication networks. The video coding device 700 may also include input and/or output (I/O) devices 760 for communicating data to and from a user. The I/O devices 760 may include output devices such as a display for displaying video data, speakers for outputting audio data, etc. The I/O devices 760 may also include input devices, such as a keyboard, mouse, trackball, etc., and/or corresponding interfaces for interacting with such output devices.

The processor 730 is implemented by hardware and software. The processor 730 may be implemented as one or more CPU chips, cores (e.g., as a multi-core processor), field-programmable gate arrays (FPGAs), application specific integrated circuits (ASICs), and digital signal processors (DSPs). The processor 730 is in communication with the downstream ports 720, Tx/Rx 710, upstream ports 750, and memory 732. The processor 730 comprises a coding module 714. The coding module 714 implements the disclosed embodiments described herein, such as methods 100, 800, and 900, which may employ a bitstream 500 and/or mechanism 600. The coding module 714 may also implement any other method/mechanism described herein. Further, the coding module 714 may implement a codec system 200, an encoder 300, and/or a decoder 400. For example, the coding module 714 can encode/decode pictures in a bitstream and encode/decode parameters associated with slices of the pictures in a plurality of APSs. In some examples, different types of parameters can be coded into different types of APSs. Further, different types of APSs can be included into different NAL unit types. Such APS types can include ALF APS, scaling list APS, and/or LMCS APS. The APS can each include APS IDs. The APS IDs of different APS types my increase in sequence over different value spaces. Also, slices and/or pictures can reference corresponding slice headers and/or picture headers. Such headers can then reference APSs that contain relevant coding tools. Such APSs can be uniquely referenced by APS ID and APS type. Such examples reduce redundant signaling of coding tool parameters and/or reduce bit usage for identifiers. Hence, coding module 714 causes the video coding device 700 to provide additional functionality and/or coding efficiency when coding video data. As such, the coding module 714 improves the functionality of the video coding device 700 as well as addresses problems that are specific to the video coding arts. Further, the coding module 714 effects a transformation of the video coding device 700 to a different state. Alternatively, the coding module 714 can be implemented as instructions stored in the memory 732 and executed by the processor 730 (e.g., as a computer program product stored on a non-transitory medium).

The memory 732 comprises one or more memory types such as disks, tape drives, solid-state drives, read only memory (ROM), random access memory (RAM), flash memory, ternary content-addressable memory (TCAM), static random-access memory (SRAM), etc. The memory 732 may be used as an over-flow data storage device, to store programs when such programs are selected for execution, and to store instructions and data that are read during program execution.

Figure 8:
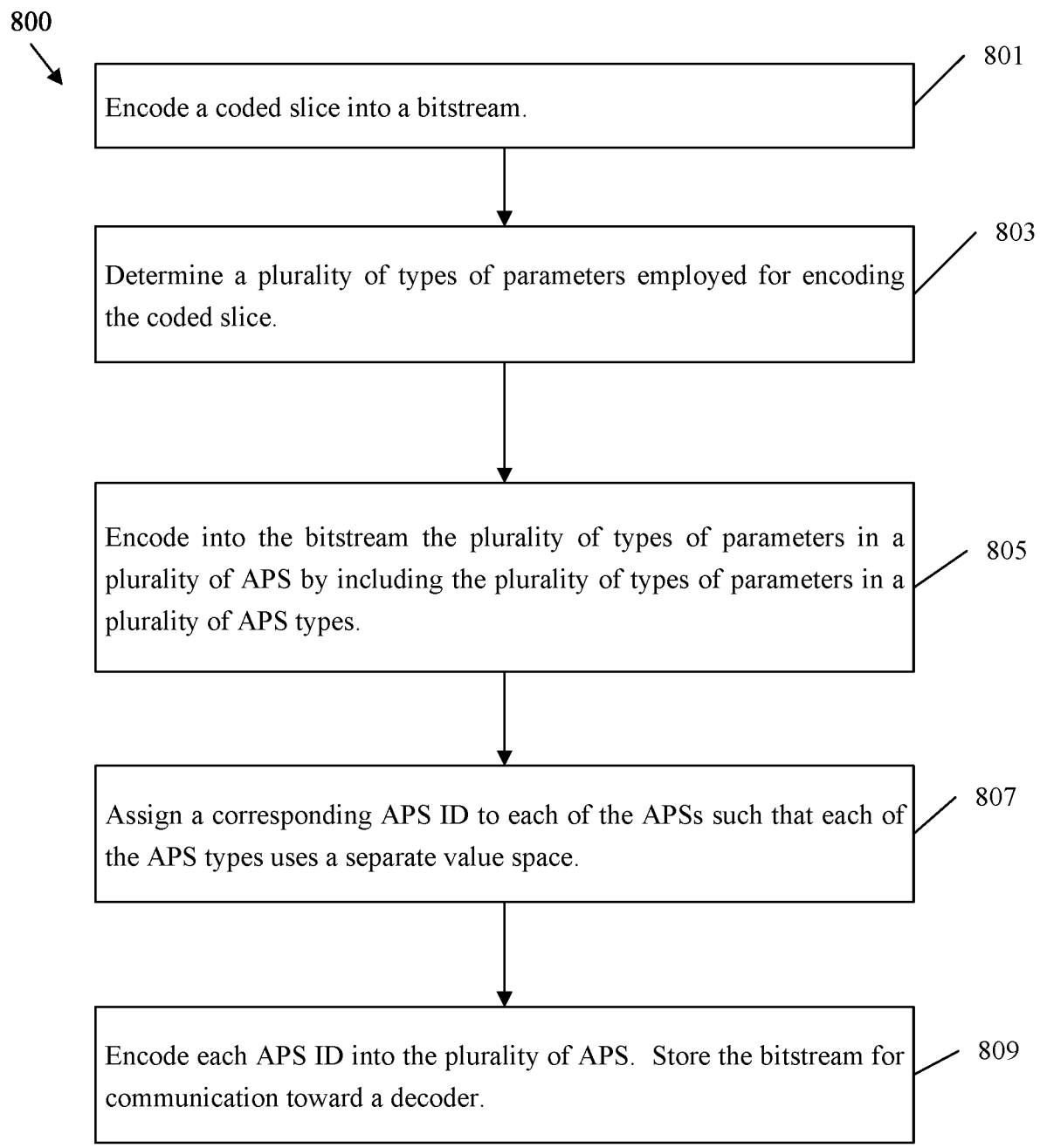
FIG. 8 is a flowchart of an example method of encoding a video sequence into a bitstream by employing a plurality of APS types.

FIG. 8 is a flowchart of an example method 800 of encoding a video sequence into a bitstream, such as bitstream 500, by employing a plurality of APS types, such as ALF APS 512, scaling list APS 513, and/or LMCS APS 514. Method 800 may be employed by an encoder, such as a codec system 200, an encoder 300, and/or a video coding device 700 when performing method 100. Method 800 may also assign APS IDs to APSs of different types by employing different value spaces according to mechanism 600.

Method 800 may begin when an encoder receives a video sequence including a plurality of pictures and determines to encode that video sequence into a bitstream, for example based on user input. The video sequence is partitioned into pictures/images/frames for further partitioning prior to encoding. At step 801, a slice is encoded into a bitstream as a coded slice as part of an encoded video sequence. The coded slice may be encoded as part of a picture. Further, the coded slice may be encoded by encoding CTUs and/or CUs contained in the coded slice. Such CUs can be coded according to intra-prediction and/or inter-prediction. For example, the encoder may code the CUs of the coded slice. The encoder may then employ a hypothetical reference decoder (HRD) to decode the coded slice and filter the decoded slice to increase the output quality of the slice.

At step 803, the encoder determines a plurality of types of parameters employed for encoding the coded slice. Such parameters may include parameters employed by filters applied by the HRD to increase the quality of the encoded slice. These parameters may include ALF parameters, scaling list parameters, and LMCS parameters. Determining these parameters allows the encoder to determine the parameters that should be employed for application to the slice at the decoder.

At step 805, the plurality of types of parameters is encoded in a plurality of APSs. Specifically, the plurality of types of parameters are separated by type and included into APSs of corresponding types. Accordingly, plurality of types of parameters is included into a plurality of APS types. For example, the plurality of APS types may include an ALF type APS containing ALF parameters, a scaling list type APS containing scaling list parameters, and a LMCS type APS containing LMCS parameters.

At step 807, APS IDs are assigned to each of the APSs. This includes assigning APS IDs for the APS types in sequence over a plurality of different value spaces. Accordingly, an corresponding APS ID is assigned to each of the APSs such that each of the APS types uses a separate value space for the APS IDs. For example, each of the different value spaces may extend over a predefined range. Further, the predefined ranges may be determined based on the APS types as specified by a parameter type of the corresponding APS. As such, each APS may include an APS ID selected from a predefined range. Such predefined ranges may be overlapping, and hence the plurality of different value spaces may also be overlapping. Further, the APS IDs may be assigned according to different sequences based on the APS types. For example, a current APS may include a current APS ID selected from a predefined range across a current value space. The current APS ID is sequentially related to a previous APS ID associated with a previous APS of the same type as the current APS. Further, the current APS ID is not related to another previous APS ID associated with another previous APS of a different type than the current APS as the sequences for the different APS types are different.

At step 809, each of the APS IDs are encoded into the plurality of APSs. An APS type may also be encoded into each APS. For example, each APS may include an APS parameter type (e.g., aps_params_type) code set to a predefined value indicating a type of parameters included in the corresponding APS. Each APS may then be identified by a combination of a current APS type and a current APS ID. The bitstream is stored in memory. Upon request, the bitstream can then be communicated toward a decoder, for example via a transmitter.

Figure 9:
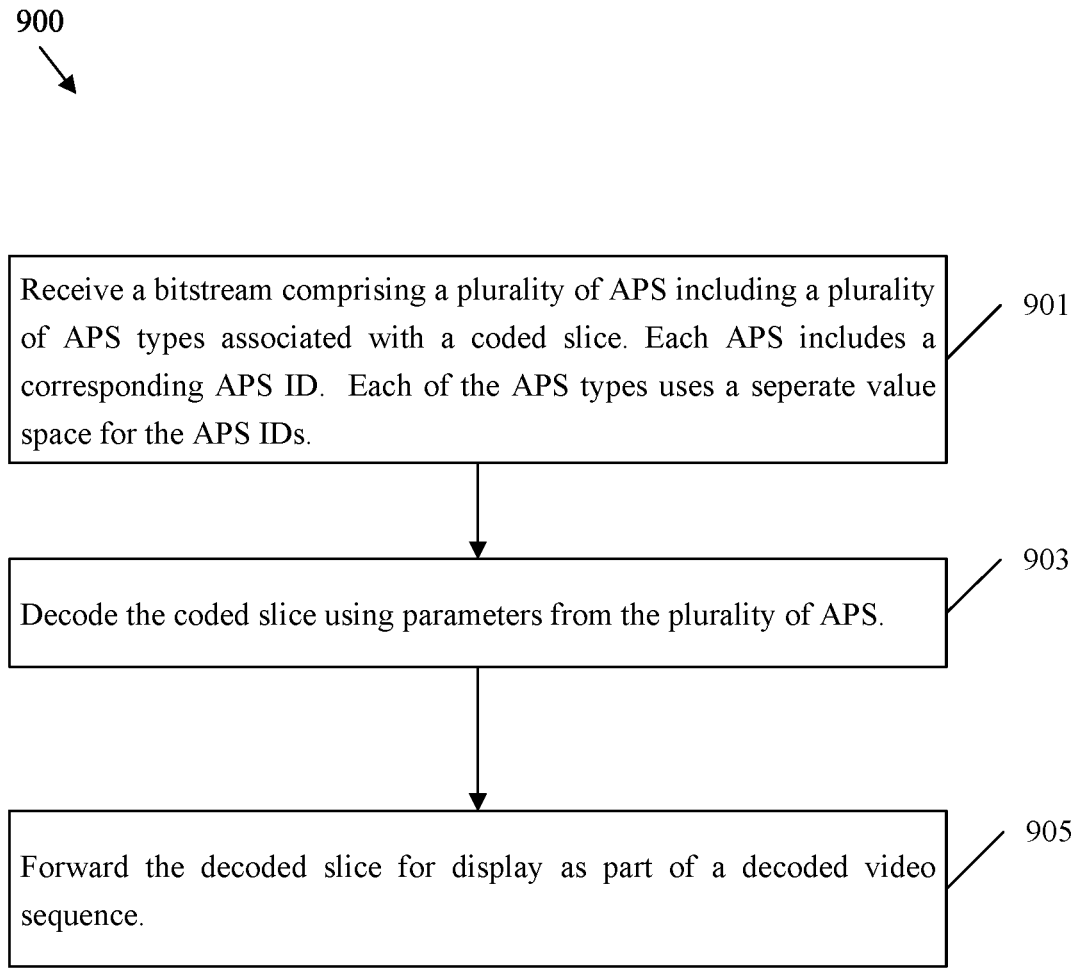
FIG. 9 is a flowchart of an example method of decoding a video sequence from a bitstream by employing a plurality of APS types.

FIG. 9 is a flowchart of an example method 900 of decoding a video sequence from a bitstream, such as bitstream 500, by employing a plurality of APS types, such as ALF APS 512, scaling list APS 513, and/or LMCS APS 514. Method 900 may be employed by a decoder, such as a codec system 200, a decoder 400, and/or a video coding device 700 when performing method 100. Method 900 may also reference APS based on APS IDs assigned according to mechanism 600 where APSs of different types employ APS IDs assigned according to different value spaces.

Method 900 may begin when a decoder begins receiving a bitstream of coded data representing a video sequence, for example as a result of method 800. At step 901, a bitstream is received at a decoder. The bitstream comprises a plurality of APSs including a plurality of APS types associated with a coded slice. The bitstream may also comprise the coded slice. The plurality of APS types may include an ALF type containing ALF parameters, a scaling list type containing scaling list parameters, and a LMCS type containing LMCS parameters. For example, each APS may include an APS parameter type (e.g., aps_params_type) code set to a predefined value indicating a type of parameters included in each APS. Each APS includes a corresponding APS ID. Further, the APS IDs for the APS types are assigned in sequence over a plurality of different value spaces. Accordingly, each of the APS types uses a separate value space for the APS ID.

The separate value spaces may be overlapping. For example, each of the separate may extend over a predefined range. The predefined ranges may be determined based on the APS types. For example, a current APS may include a current APS ID selected from a predefined range across a current value space. The current APS ID is related to a previous APS ID associated with a previous APS of the same type as the current APS. However, the current APS ID is not related to another previous APS ID associated with another previous APS of a different type than the current APS. Hence, each APS is identified by a combination of a current APS type and a current APS ID.

The decoder can obtain the parameters from the plurality of APSs by employing the APS IDs and the APS types. For example, the decoder can employ a header related to the coded slice that references the APS of each type. The decoder can then obtain the parameters for the coded slice based on such references. At step 903, the coded slice is decoded using parameters from the plurality of APSs. At step 905, the decoder can forward the decoded slice for display as part of a decoded video sequence.

Figure 10:
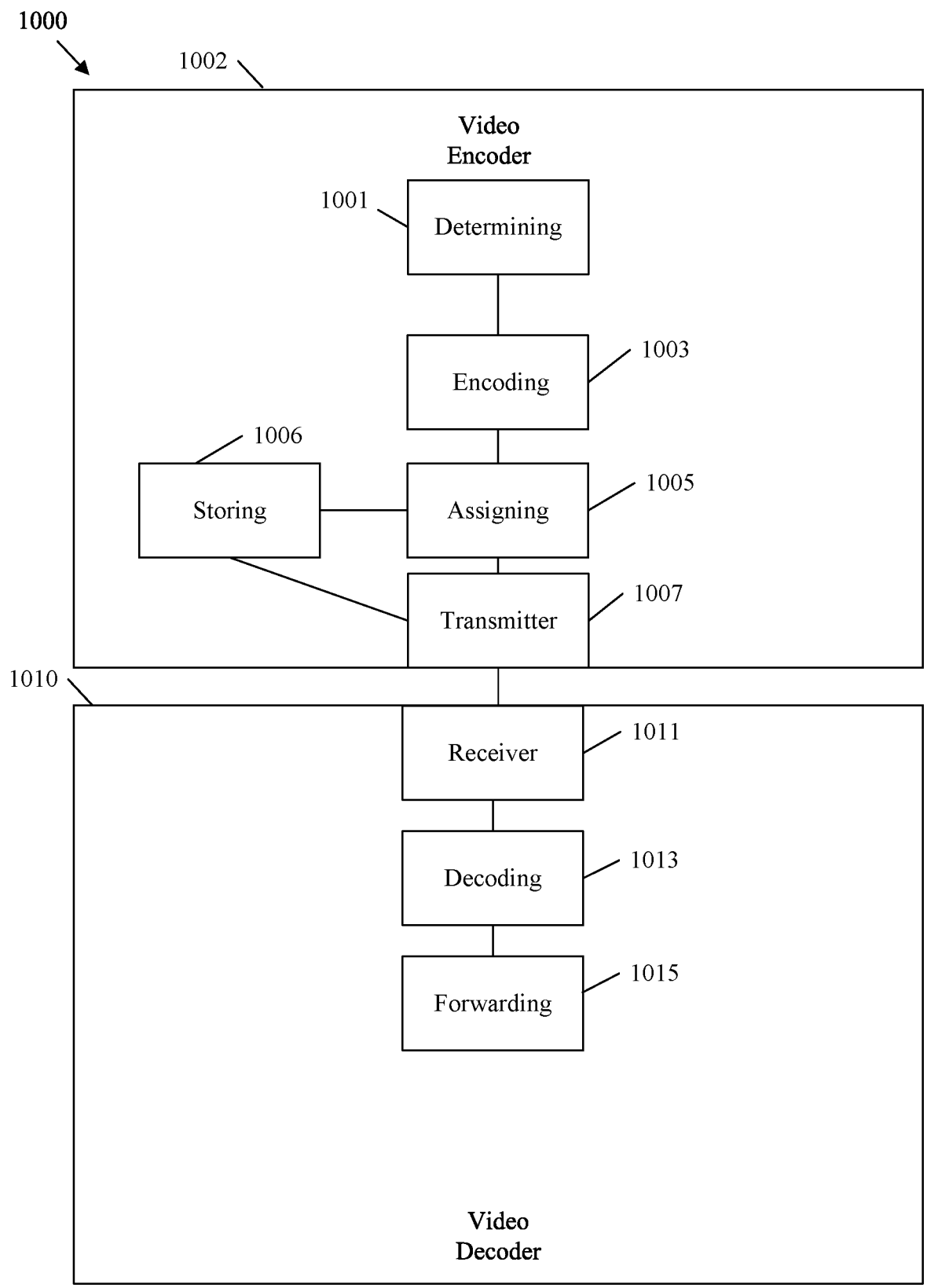
FIG. 10 is a schematic diagram of an example system for coding a video sequence of images in a bitstream by employing a plurality of APS types.

FIG. 10 is a schematic diagram of an example system 1000 for coding a video sequence of images in a bitstream, such as bitstream 500, by employing a plurality of APS types, such as ALF APS 512, scaling list APS 513, and/or LMCS APS 514. System 1000 may be implemented by an encoder and a decoder such as a codec system 200, an encoder 300, a decoder 400, and/or a video coding device 700. Further, system 1000 may be employed when implementing method 100, 800, 900, and/or mechanism 600.

The system 1000 includes a video encoder 1002. The video encoder 1002 comprises a determining module 1001 for determining a plurality of types of parameters employed for encoding a slice. The video encoder 1002 further comprises an encoding module 1003 for encoding the slice into a bitstream. The encoding module 1003 is further for encoding into the bitstream the plurality of types of parameters in a plurality of APSs by including the plurality of types of parameters in a plurality of APS types. The encoding module 1003 is further for encoding APS IDs into the plurality of APSs. The video encoder 1002 further comprises an assigning module 1005 for assigning the APS IDs to each of the APS by assigning APS IDs for the APS types in sequence over a plurality of different value spaces. The video encoder 1002 further comprises a storing module 1006 for storing the bitstream for communication toward a decoder. The video encoder 1002 further comprises transmitting module 1007 for transmitting the bitstream including the plurality of APSs with the plurality of parameter types to support decoding the slices at a decoder. The video encoder 1002 may be further configured to perform any of the steps of method 800.

The system 1000 also includes a video decoder 1010. The video decoder 1010 comprises a receiving module 1011 for receiving a bitstream comprising a slice and a plurality of APSs including a plurality of APS types, wherein each APS includes an APS ID, and wherein APS IDs for the APS types are assigned in sequence over a plurality of different value spaces. The video decoder 1010 further comprises a decoding module 1013 for decoding the slice using parameters from the plurality of APSs. The video decoder 1010 further comprises a forwarding module 1015 for forwarding the slice for display as part of a decoded video sequence. The video decoder 1010 may be further configured to perform any of the steps of method 900.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a decoder, the method comprising:
   receiving a bitstream comprising a plurality of adaptation parameter sets (APSs) each including a corresponding APS identifier (ID), the APSs including a plurality of APS types each using a separate value space for the APS IDs, wherein the plurality of APSs are referenced by a coded slice, wherein each of the separate value spaces extends over a predefined range, wherein the predefined ranges are determined based on the APS types, wherein each APS includes an APS parameter type (aps_params_type) set to a predefined value specifying a parameter type of each APS, the parameter type specifying adaptive loop filter (ALF) parameters or luma mapping with chroma scaling (LMCS) parameters, and wherein the bitstream further comprises a sequence parameter set (SPS) including a LMCS enabled flag set to one when LMCS is enabled and set to zero when LMCS is disabled; and
   decoding the coded slice using parameters obtained from the plurality of APSs based on the APS IDs.

2. The method of claim 1, wherein the separate value spaces are overlapping.

3. The method of claim 1, wherein a current APS includes a current APS ID selected from a range across a current value space, wherein the current APS ID is related to a previous APS ID associated with a previous APS of a same type as the current APS, and wherein the current APS ID is not related to another previous APS ID associated with another previous APS of a different type than the current APS.

4. The method of claim 1, wherein each APS is identified by a combination of a current APS type and a current APS ID.

5. A method implemented by an encoder, the method comprising:
   encoding a slice into a bitstream as a coded slice;
   determining, a plurality of types of parameters employed for encoding the coded slice;
   encoding into the bitstream the plurality of types of parameters in a plurality of adaptation parameter sets (APSs) by including the plurality of types of parameters in a plurality of APS types and a sequence parameter set (SPS);
   assigning a corresponding APS identifier (ID) to each of the APSs such that each of the APS types uses a separate value space for the APS IDs, wherein each of the separate value spaces extends over a predefined range, wherein the predefined ranges are determined based on the APS types, wherein each APS includes an APS parameter type (aps_params_type) set to a predefined value specifying a parameter type of each APS, the parameter type specifying adaptive loop filter (ALF) parameters or luma mapping with chroma scaling (LMCS) parameters, and wherein the SPS includes a LMCS enabled flag set to one when LMCS is enabled and set to zero when LMCS is disabled;
   encoding each APS ID into the plurality of APSs; and
   storing the bitstream for communication toward a decoder.

6. The method of claim 5, wherein the separate value spaces are overlapping.

7. The method of claim 5, wherein a current APS includes a current APS ID selected from a range across a current value space, wherein the current APS ID is related to a previous APS ID associated with a previous APS of a same type as the current APS, and wherein the current APS ID is not related to another previous APS ID associated with another previous APS of a different type than the current APS.

8. The method of claim 5, wherein each APS is identified by a combination of a current APS type and a current APS ID.

9. A video coding device comprising:
   a receiver configured to receive a bitstream comprising a plurality of adaptation parameter sets (APSs) each including a corresponding APS identifier (ID), the APSs including a plurality of APS types each using a separate value space for the APS IDs, wherein the plurality of APSs are referenced by a coded slice, wherein each of the separate value spaces extends over a predefined range, wherein the predefined ranges are determined based on the APS types, and wherein each APS includes an APS parameter type (aps_params_type) set to a predefined value specifying a parameter type of each APS, the parameter type specifying adaptive loop filter (ALF) parameters or luma mapping with chroma scaling (LMCS) parameters, and wherein the bitstream further comprises a sequence parameter set (SPS) including a LMCS enabled flag set to one when LMCS is enabled and set to zero when LMCS is disabled; and a processor configured to decode the coded slice using parameters obtained from the plurality of APSs based on the APS IDs.

10. The video coding device of claim 9, wherein a current APS includes a current APS ID selected from a range across a current value space, wherein the current APS ID is related to a previous APS ID associated with a previous APS of a same type as the current APS, and wherein the current APS ID is not related to another previous APS ID associated with another previous APS of a different type than the current APS.

11. The video coding device of claim 9, wherein each APS is identified by a combination of a current APS type and a current APS ID.

* * * * *